United States Patent
Mochida

(10) Patent No.: US 6,539,803 B2
(45) Date of Patent: Apr. 1, 2003

(54) EXTERNAL FORCE MEASURING DEVICE

(75) Inventor: Yoichi Mochida, Fujisawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/899,327

(22) Filed: Jul. 5, 2001

(65) Prior Publication Data

US 2002/0078746 A1 Jun. 27, 2002

(30) Foreign Application Priority Data

Dec. 28, 2000 (JP) .......................................... 2000-402395
Jul. 7, 2000 (JP) .......................................... 2000-207128

(51) Int. Cl.[7] .............................................. G01C 19/00
(52) U.S. Cl. .................................. 73/504.12; 73/514.32
(58) Field of Search ......................... 73/504.12, 504.14, 73/504.04, 504.03, 514.29, 514.32

(56) References Cited

U.S. PATENT DOCUMENTS 6,230,563 B1 * 5/2001 Clark et al. .............. 73/504.04
6,250,156 B1 * 6/2001 Seshia et al. ............. 73/504.12

* cited by examiner

*Primary Examiner*—Richard A. Moller
(74) *Attorney, Agent, or Firm*—Keating & Bennett, LLP

(57) ABSTRACT

A center mass and a pair of outer masses are connected to each other via supporting beams displaceable in the X-axial direction. When an angular velocity sensor is operated, a vibration generator causes masses to vibrate substantially at opposite phases to each other with respect to the X-axial direction. In this state, if an angular velocity on the Y-axis is added, the displacements of the masses, caused when the masses are displaced in the Z-axial direction, are detected as the angular velocity. Moreover, fixing portions, formed on a substrate, support the nodes of the supporting beams corresponding to the nodes to suppress vibration of the masses from being transmitted to the substrate.

14 Claims, 17 Drawing Sheets

EXTERNAL FORCE MEASURING DEVICE

BACKGROUND OF THE INVENTION

1. Field of the Invention

The present invention relates to an external force measuring device suitable for use in detection of, e.g., an angular velocity, an acceleration, and so forth.

2. Description of the Related Art

In general, as external force measuring devices, angular velocity sensors have been known, each of which comprises a substrate, a mass supported displaceably in two orthogonal directions on the substrate via supporting beams, a vibration generating means for vibrating the mass in a vibration-direction parallel to the substrate in one of the two directions, and an angular velocity detection means for detecting the displacement of the mass caused when the mass is displaced in a detection-direction perpendicular to the vibration-direction (for example, Japanese Unexamined Patent Application Publication No. 5-312576).

In an angular velocity sensor produced in such a first conventional technique, the mass is vibrated at a predetermined amplitude, e.g., in the X-axial direction of the X and Y axial directions parallel to the substrate. In this state, if an angular velocity on the Z axis is applied, a Coriolis force acts on the mass, so that the mass is displaced in the Y-axial direction. Therefore, the angular velocity detection means detects the displacement of the mass as a variation in electrostatic capacitance or the like to output a detection signal corresponding to the angular velocity.

In this case, the mass is supported displaceably (vibration) in the X-axial direction and so forth by the supporting beams provided on the substrate. The supporting beams are fixed to the substrate on the base-ends thereof. The top ends thereof are connected to the mass. When the angular velocity sensor is operated, the supporting beams are deflected, and thereby, the mass is vibrated in the X-axial direction.

In a second conventional technique described, e.g., in Japanese Unexamined Patent Application PublicationNo. 7-218268, an angular velocity sensor, called a tuning fork, is used. A pair of masses, arranged on a substrate, are vibrated at opposite phases to each other. The vibration to be transmitted from the masses to the substrate via supporting beams is canceled out by means of a pair of the masses.

In this case, the supporting beams which support a pair of the masses have complicated shapes having plural flexed portions so that each of the masses can be supported at one site on the substrate. Moreover, the top ends of the supporting beams are branched and connected to the respective masses.

In the above-described first conventional technique, the mass is connected to the substrate via the supporting beams. Therefore, when the mass is vibrated on the substrate, the vibration is readily transmitted to the substrate side via the supporting beams.

For this reason, when the angular velocity sensor is operated, vibration energy is leaked toward the substrate side, so that the amplitudes and the vibration velocity of the mass are reduced, and a Coriolis force caused by the angular velocity is decreased. As a result, the detection sensitivity may be unstable. Moreover, when the vibration is transmitted to the substrate, the mass may be vibrated in the detection direction, due to vibration of the substrate, though no angular velocity is applied to the mass. Thus, this causes the problem that errors are readily generated in detection values of the angular velocity, and the reliability is deteriorated.

On the other hand, in the second conventional technique, the pair of masses are vibrated at opposite phases, so that the vibration to be transmitted to the substrate side is canceled out. However, these masses are supported by supporting beams having complicated flexed shapes. Therefore, in production of the sensor, it is difficult to render the supporting beams, e.g., the sizes, shapes, characteristics at deflecting, and so forth evenly with respect to the masses provided on the opposite sides.

For this reason, in the second conventional technique, dispersions in size and errors in working or the like of the supporting beams may cause a difference between the vibration states of the pair of the masses. Thus, there arises the problems that vibration of the respective masses transmitted to the substrate side cannot be stably canceled out.

On the other hand, when the angular velocity sensor is operated, and an acceleration in the Y-axial direction is added to the sensor, due to an external force of collision or the like, the masses may be displaced in the Y-axial direction, caused by not only the Coriolis force caused by the angular velocity but also the inertial force by the acceleration. Thus, the displacement comprising the angular velocity component and the acceleration component is detected as the angular velocity.

As a result, in the first conventional technique, even if collision or the like is slightly added to the angular velocity sensor, for example, the acceleration component, caused by the collision or the like, is contained as an error in an angular velocity detection signal, which deteriorates the detection accuracy of the angular velocity. Thus, there arises the problem that the reliability is enhanced with difficulty.

Especially, in the case in which the acceleration to be added to the sensor has a frequency component of which the frequency is near the vibration frequency of the masses, an error, caused by the acceleration component, can not be securely eliminated even if the detection signal is synchronously rectified and integrated at a constant period corresponding to the vibration frequency to carry out the signal processing such as synchronous detection or the like which extracts the angular velocity component.

SUMMARY OF THE INVENTION

In view of the above-described problems of the conventional techniques, the present invention has been devised. It is a first object of the present invention to provide an external measuring device in which vibration of masses can be prevented from being transmitted to the substrate side via supporting beams, the vibration state can be stably kept on the substrate, and moreover, the detection sensitivity and detection accuracy and reliability can be enhanced.

Moreover, it is a second object of the present invention to provide an external force measuring device in which even if both of the angular velocity and the acceleration are applied to the masses, at least the angular velocity can be accurately detected, separately from the acceleration, and the detection operation can be stabilized.

To solve the above-described problems, according to a first aspect of the present invention, there is provided an external force measuring device which comprises a substrate, plural masses opposed to and spaced from the substrate, arranged along the Y-axial direction of three orthogonal axial directions, that is, X-, Y-, and Z-axial directions, such as to be vibratable in the X-axial direction at opposite phases to each other by a vibration generator; supporting beams connecting the respective masses displaceably in the X-axial direction, fixing portions provided between the supporting beams and the substrate, and an external force detector for detecting, as the angular velocity or acceleration, a displacement of the respective masses in one of the Y-axial and Z-axial directions, caused when an angular velocity or an acceleration acts on the respective masses.

Owing to the above-described configuration, the plural masses can be connected by the supporting beams in the Y-axial direction perpendicular to the vibration direction (X-axial direction). For example, a part of the masses are vibrated by means of the vibration generator, and thereby, neighboring masses can be vibrated substantially at opposite phases. Thereby, on the sites in the middles of the supporting beams connecting the masses, the nodes of vibration can be arranged at which the supporting beams are positioned substantially constantly when the supporting beams, together with the respective masses, are vibrated.

Moreover, for example, two masses to be vibrated at opposite phases, when an angular velocity is applied, are displaced in the opposite directions, due to the Coriolis force, and when an acceleration is applied, are displaced in the same direction, due to the inertial force. Therefore, the angular velocity and the acceleration can be detected, distinguished from each other, by comparison of the displacements of the masses.

Preferably, the fixing portions connect to the substrate the sites of the supporting beams corresponding to the nodes when the respective masses are vibrated at opposite phases to each other.

Thereby, the fixing portions can fix the supporting beams to the substrate at the sites corresponding to the vibration nodes caused when the masses and the supporting beams are vibrated. Accordingly, the fixing portions can suppress vibration of the masses from being transmitted to the substrate side.

Additionally, the supporting beams may support the respective masses displaceably in the Z-axial direction, and the external force detecting means detects the displacement of the respective masses caused when the masses are displaced in the Z-axial direction.

Accordingly, the masses can be displaced in the Z axial direction correspondingly to an external force such as an angular velocity, an acceleration, and so forth, while the masses are being vibrated in the X-axial direction. Then, the displacement can be detected as an angular velocity or acceleration by the external force detector.

Also preferably, the respective masses comprise a first mass positioned in the center in the Y-axial direction, and second masses positioned on both of the sides in the Y-axial direction of the first mass, the first mass being supported by the supporting beams via mass-supporting beams displaceable in the Y-axial direction, and the external force detector detecting the displacement when the first mass is displaced in the Y-axial direction.

Accordingly, the second masses can be arranged in a symmetrical pattern, sandwiching the first mass. These masses can be stably vibrated at opposite phases in the X-axial direction. In this state, when the first mass is displaced in the Y-axial direction correspondingly to the angular velocity, the displacement can be detected as an angular velocity by means of the external force detector. Moreover, when no angular velocity is applied to the sensor, the first and second masses are vibrated only in the X-axial direction. At this time, the mass-supporting beams can be held so as not to be displaced in the Y-axial direction. Accordingly, the first mass can be prevented from being displaced in the Y-axial direction in error.

According to a second aspect of the present invention, there is provided an external force measuring device which comprises a substrate, a first mass opposed to and spaced from the substrate, arranged along the Y-axial direction of three orthogonal axial directions, that is, X-, Y-, and Z-axial directions, such as to be vibratable in the X-axial direction by a vibration generator; second masses provided on both of the sides in the Y-axial direction of the first mass so as to sandwich the first mass and to be vibrated in the X-axial direction by the vibration generator, third masses positioned between the first mass and the second masses so as to surround the first mass, supporting beams connecting the second masses to each other displaceably in the X-axial direction; connecting portions connecting the third masses to the supporting beams, mass-supporting beams the first mass to the third masses displaceably in the Y-axial direction; fixing portions provided between the substrate and the supporting beams and connecting the supporting beams to the substrate, and an external force detector for detecting, as an angular velocity, the displacement in the Y-axial direction of the first mass, caused when an angular velocity acts on the first mass, the first and third masses, and the second and fourth masses being vibrated at opposite phases to each other.

Accordingly, the first mass can be displaced in the Y-axial direction according to the angular velocity, while the first, second, and third masses are vibrated in the X-axial direction, by the vibration generator. When no angular velocity is applied to the sensor, the supporting beams are deflected in the X-axial direction, and thereby, the first, second, and third masses are vibrated only in the X-axial direction, and then, the first mass, surrounded by the third masses, can be held so as not to be displaced in the Y-axial direction. Therefore, the third masses can interrupt deflection or the like of the supporting beams from being converted to a displacement in the Y-axial direction and being transmitted to the first mass.

Preferably, the fixing portions connect to the substrate the sites of the supporting beams corresponding to the nodes caused when the first and third masses and the second mass are vibrated at opposite phases to each other.

Accordingly, the fixing portions fix to the substrate the sites of the supporting beams corresponding to the nodes caused when the first, second, and third masses and the supporting beams are vibrated. Thus, vibration of the respective masses can be prevented from being transmitted to the substrate side via the supporting beams.

Additionally, the masses may comprise a first mass positioned in the center in the Y-axial direction, and second masses positioned on both of the sides in the Y-axial direction of the first mass, and the first and second masses are connected to the supporting beams via the first and second mass supporting beams displaceable in the Y-axial direction, respectively.

Accordingly, the first and second masses can be vibrated in the X-axial direction via the supporting beams. In this state, the first mass can be displaced in the Y-axial direction, correspondingly to an external force, by the first-mass supporting beams. The external force detector can detect an angular velocity or acceleration.

According to a third aspect of the present invention, there is provided an external force measuring device which comprises a substrate, a first mass opposed to and spaced from the substrate, such as to be vibratable in the X-axial direction of three orthogonal axial directions, that is, X-, Y-, and Z-axial direction, by a first vibration generator, second masses provided on both of the sides in the Y-axial direction of the first mass so as to sandwich the first mass and to be vibrated in the X-axial direction by a second vibration generator, third masses positioned between the first mass and the second masses so as to surround the first mass, fourth masses surrounding the second masses, supporting beams connecting the fourth masses to each other displaceably in the X-axial direction, connecting portions connecting the third masses to the supporting beams, first mass supporting beams connecting the first mass to the third masses displaceably in the Y-axial direction, second mass supporting beams connecting the second masses to the fourth masses displaceably in the Y-axial direction, fixing portions provided between the substrate and the supporting beams and connecting the supporting beams to the substrate, and an external force detector for detecting, as an angular velocity or acceleration, the displacement in the Y-axial direction of the first and second masses, caused when an angular velocity or acceleration acts on the first and second masses, said first and third masses, and said second and fourth masses being vibrated at opposite phases to each other.

Accordingly, the first, second, third, and fourth masses can be vibrated in the X-axial direction. In this state, the first and second masses can be displaced in the Y-axial direction correspondingly to an external force by means of the first and second mass supporting beams. Moreover, the third mass can interrupt the deflection or the like of the supporting beams from being transmitted to the first mass. The fourth mass can interrupt deflection or the like of the supporting beams from being transmitted to the second mass.

Accordingly, the fixing portions can connect to the substrate the sites of the supporting beams corresponding to the nodes caused when the first, second, third, and fourth masses are vibrated. Thus, vibration of the respective masses can be suppressed from being transmitted to the substrate side via the supporting beams.

Moreover, the external force detecting means combines displacements of the respective masses caused when the masses are vibrated to opposite phases to be displaced in the Y-axial direction to detect, so that at least the angular velocity applied to the respective masses is separated from an acceleration and detected.

Accordingly, for example, two masses vibrating at opposite phases, when an angular velocity is added, are displaced in the opposite directions to each other, due to the Coriolis force, and the two masses, when an acceleration is added, are displaced in the same direction, due to the inertial force. Therefore, e.g., by subtracting the displacements of the respective masses, the components in the same direction (acceleration components) of these displacements can be canceled out to be removed. Thus, at least the angular velocity can be detected, separately from the acceleration.

Preferably, the external force detector comprises fixed detection electrodes positioned between the first mass and the second masses and provided on the substrate; first movable detection electrodes provided on the first mass and opposed to and spaced in the Y-axial direction from the fixed detection electrodes, and second movable detection electrodes provided on the second masses and opposed to and spaced in the Y-axial direction from the fixed detection electrodes, the external force detector detecting, in parallel, displacements of the first and second movable detection electrodes with respect to the fixed detection electrodes as variations in electrostatic capacitance.

Accordingly, if an angular velocity is applied to the respective masses while the first and second masses are vibrated at opposite phases, these masses are displaced in the opposite directions to each other, due to the Coriolis force. As a result, for example, both of the first and second movable detection electrodes can be positioned near the fixed detection electrodes, and the electrostatic capacitances between the fixed detection electrodes and the movable detection electrodes can be increased, correspondingly to the angular velocity. Moreover, if an acceleration is applied to the first and second masses, these masses are displaced in the same direction. Thus, one of the first and second movable detection electrodes can be positioned near the fixed detection electrode, and the other can be more separated from the fixed detection electrode. Thus, variations in electrostatic capacitances between the detection electrodes, caused by the acceleration, can be canceled out.

Preferably, the external force detector comprises a first displacement detecting portion for detecting a displacement caused when the first mass, which is one of the first and second masses vibrating at opposite phases to each other, is displaced in the Y-axial direction, a second displacement detecting portion for detecting displacements caused when the second masses are displaced in the Y-axial direction, and an external force operation section for individually operating the angular velocity and the acceleration, using the displacements detected by the first and second displacement detecting portions.

Accordingly, the first and second displacement detecting portions can detect the displacements caused when the first and second masses vibrating at opposite phases are displaced in the Y-axial direction. If both of an angular velocity and an acceleration are applied, the two detection values include angular velocity components of the first and second masses displaced in the opposite directions correspondingly to the angular velocity, and acceleration components of the first and second masses displaced in the same direction correspondingly to the acceleration. Therefore, in the external force operation section, the angular velocity and the acceleration can be individually operated by addition or subtraction of these two detection values.

Preferably, the external force detector comprises fixed detection electrodes each having plural electrodes fixedly formed in an interdigitated pattern on the substrate, and movable detection electrodes formed on the masses and having plural electrode plates formed so as to be interdigitatedly engaged with and spaced from the plural electrodes of the respective fixed detection electrodes in the Y-axial direction, and the external force detection means detecting variations in electrostatic capacitance between the fixed detection electrodes and the movable detection electrodes as the displacements of the masses.

Accordingly, the electrode plates of the fixed detection electrodes and the movable detection electrodes are interdigitatedly engaged with each other, so that large areas between the opposed detection electrodes can be produced. When the masses are displaced in the Y-axial direction, caused by an external force, the displacements can be detected as variations in distance (electrostatic capacitance) between the detection electrodes.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS

Hereinafter, external force measuring devices according to embodiments of the present invention will be described with reference to the accompanying drawings.

FIGS. 1 to 4 illustrate a first embodiment of the present invention. In this embodiment, as the external force measuring device, an angular velocity sensor will be described by way of an example.

In FIGS. 1 to 4, an angular velocity sensor 1 according to this embodiment, and a substrate 2 constituting the body of the angular velocity sensor 1 are shown. The substrate 2 is formed in a quadrangular shape, e.g., by use of a silicon material, a glass material, or the like, each having a high resistance.

Figure 1:
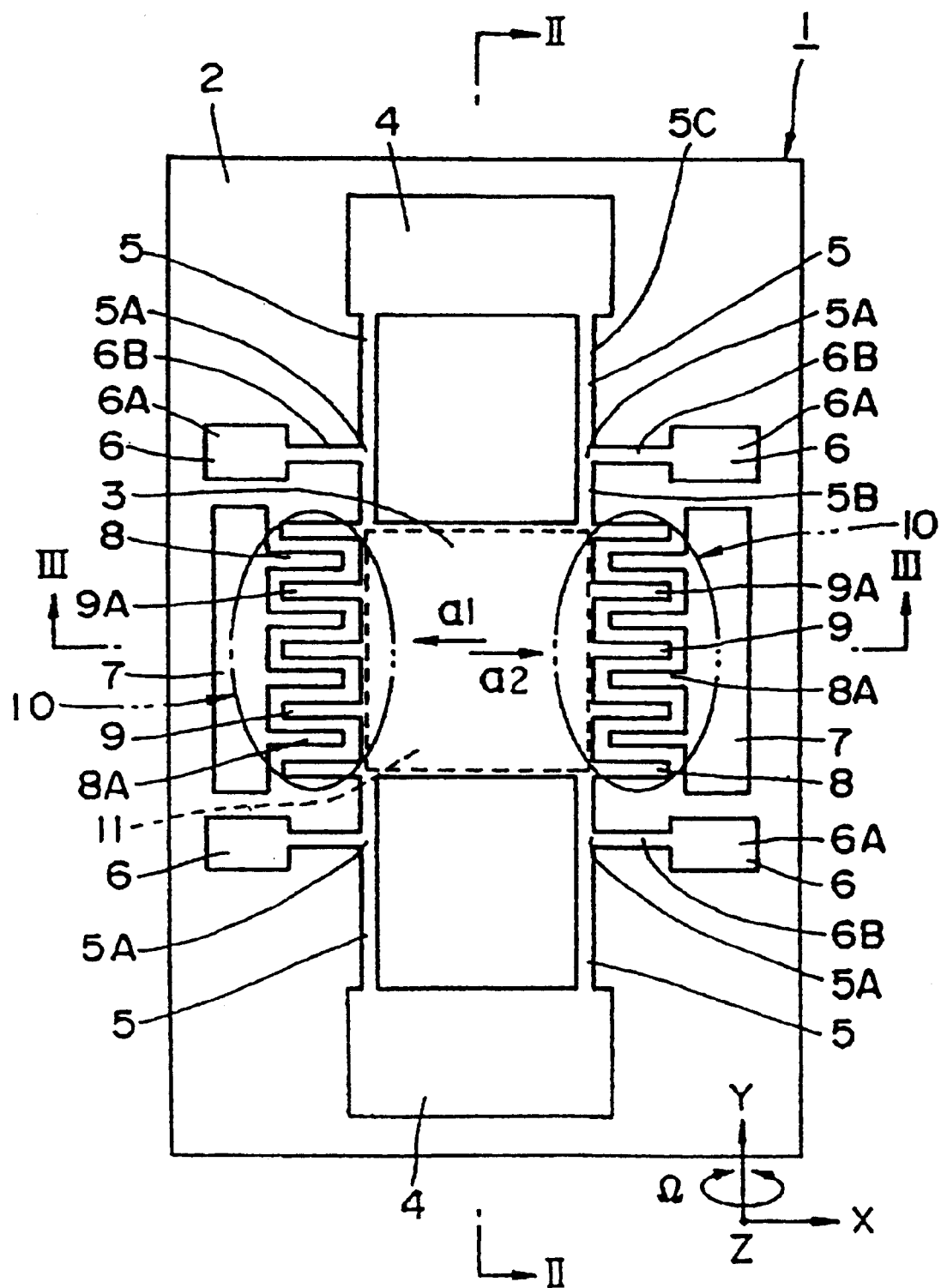
FIG. 1 is a plan view of an angular velocity sensor according to a first embodiment of the present invention.
Figure 2:
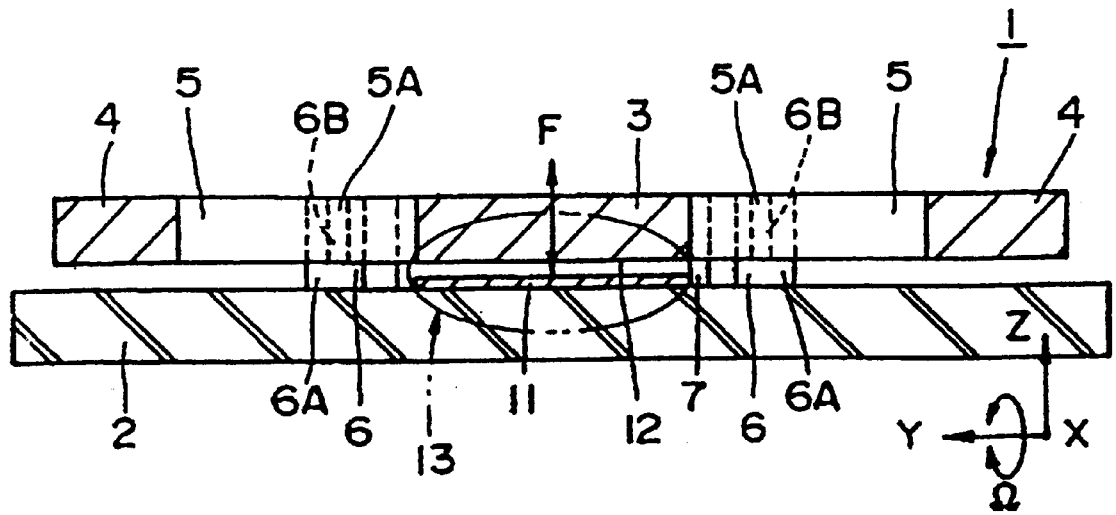
FIG. 2 is a cross sectional view of the angular velocity sensor taken along arrow II—II in FIG. 1.
Figure 3:
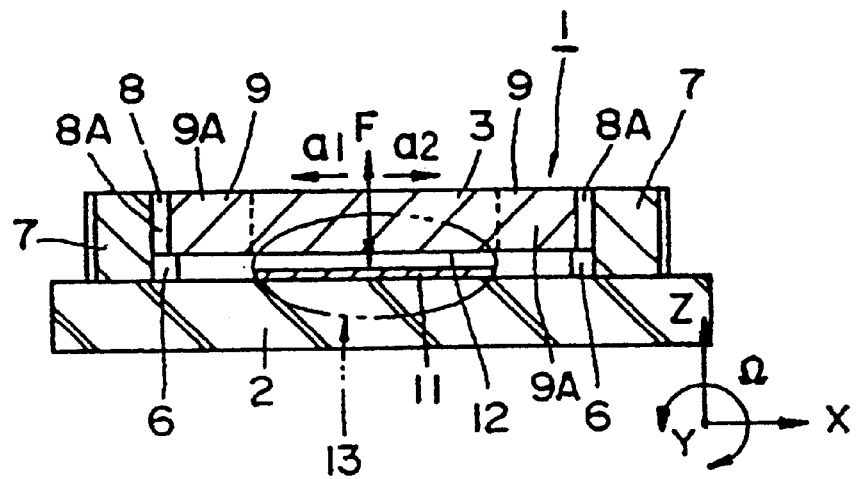
FIG. 3 is a cross sectional view of the angular velocity sensor taken along arrow III—III in FIG. 1.

As shown in FIGS. 1 to 3, for example, a single crystal or polycrystal silicon material with a low resistance is provided on the substrate 2, and is subjected to fine-processing such as etching or the like, whereby a center mass 3, external masses 4, supporting beams 5, fixing portions 6, drive electrodes 8 and 9, and detection electrodes 11 and 23, are formed.

The center mass 3 as a first mass is disposed near the center of the substrate 2, and is formed in a quadrangular flat plate shape. The center mass 3 is connected to the outer masses 4 via the respective supporting beams. These masses 3 and 4 are supported by the supporting beams 5 displaceably in the X-axial direction (vibration direction) and the Z-axial direction (detection direction), and are arranged substantially in a straight line along the Y-axial direction in a plane parallel to the substrate 2.

The outer masses 4 and 4 as second masses are arranged on both of the sides in the Y-axial direction of the center mass 3. The outer masses 4 are formed, e.g., in a quadrangular flat plate shape, respectively. The respective outer masses 4 are fixed to both of the ends of the supporting beams 5, and can be displaced in the X-axial direction with respect to the center mass 3.

The supporting beams 5, 5, . . . , e.g., four in number, connect the center mass 3 to the outer masses 4 displaceably in the X axial direction. The supporting beams 5 are formed in a straight line shape, so as to have substantially the same length, and can be deflected in the X- and Y-axial directions. The supporting beams 5 are arranged on both of the sides of the center mass 3, two supporting beams 5 for each side thereof, and are elongated in the Y-axial direction to the outer masses 4.

Figure 4:
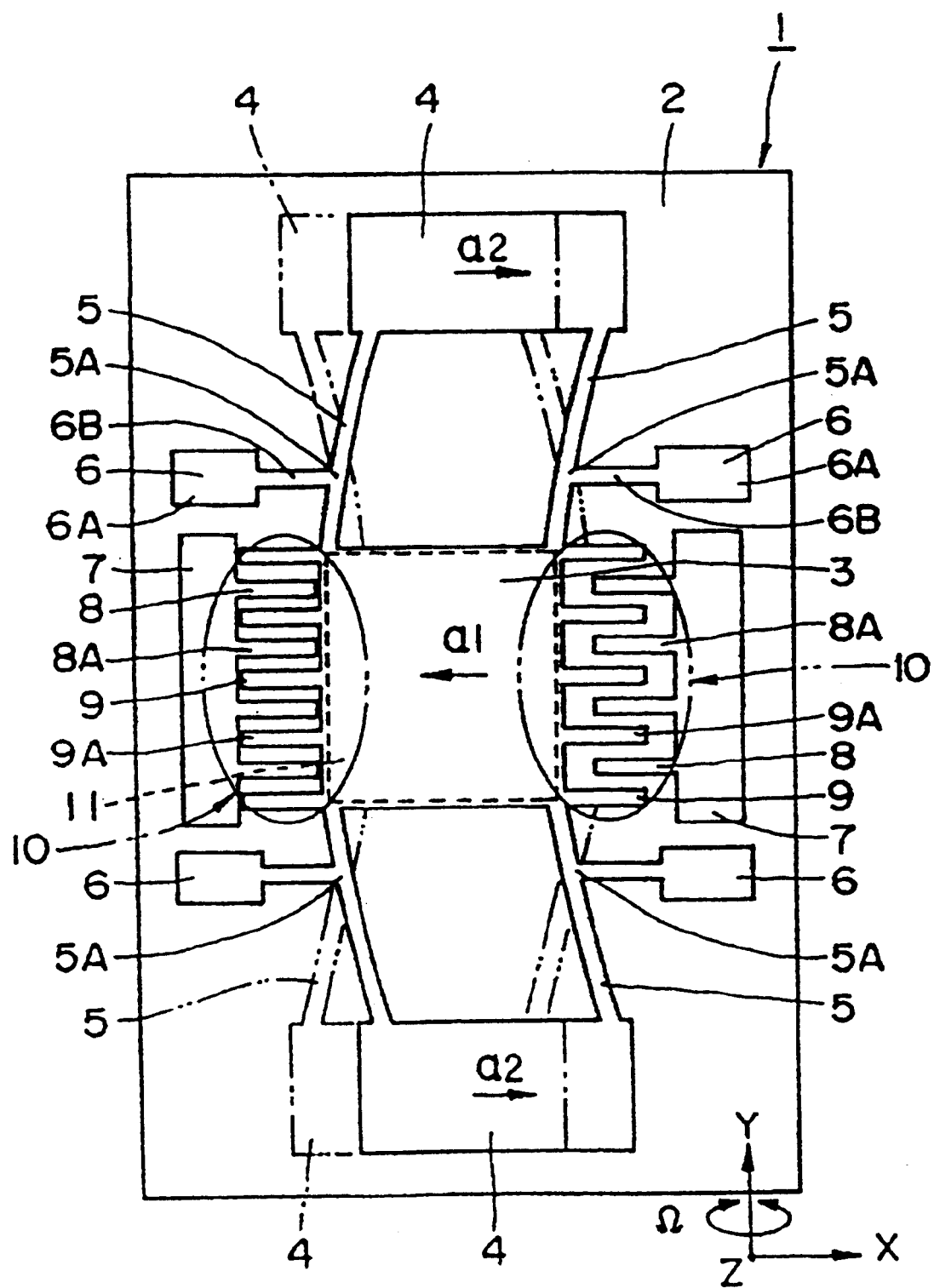
FIG. 4 is a plan view showing the state in which the center and outer masses are vibrated at opposite phases.

When the angular velocity sensor 1 is operated, the center mass 3 and outer masses 4 are vibrated substantially at opposite phases in the X-axial direction, as shown in FIG. 4. In this case, nodes 5A are arranged at sites in the middles in the longitudinal direction of the supporting beans 5. The nodes 5A are maintained substantially at constant positions, since vibrations of the masses 3 and 4 are canceled out in the state in which the masses 3 and 4 are constantly vibrated at opposite phases.

The fixing portions 6, 6, . . . , e.g., four in number, connect the nodes 5A of the supporting beams 5 to the substrate 2. As shown in FIGS. 1 to 3, the fixing portions 6 are arranged on the right and left sides in the X-axial direction of each supporting beam 5, two fixing portions 6 for each side thereof, and are separated from each other in the Y-axial direction, sandwiching drive electrode supporting beams 7, respectively. Each of the fixing portions 6 comprises a seat 6A fixed to the substrate 2, and an arm 6B projecting from the seat 6A to the neighboring supporting beam 5 in the X-axial direction and arranged separately from the substrate 2.

The top projecting ends of the arms 6B are connected to the nodes 5A of the supporting beams 5, respectively. The fixing portions 6 and the supporting beams 5 cooperate so as to support the masses 3 and 4 displaceably in the X- and Z-axial directions. When the center mass 3 and the outer masses 4 are vibrated at opposite phases, vibrations of the masses 3 and 4 are canceled out at the nodes 5A of the supporting beams 5. Thus, the fixing portions 6 suppress vibrations of the masses 3 and 4 from being transmitted to the substrate 2.

The drive electrode supporting portions 7, 7, provided on the substrate 2, are arranged on both of the sides, that is, on the right and left sides in the X-axial direction of the center mass 3.

Fixed drive electrodes 8, 8, provided on the drive electrode supporting portions 7, project from the supporting portions 7 in the X-axial direction, and have plural electrode plates 8A, 8A, . . . arranged in an interdigitated pattern having intervals in the Y-axial direction, respectively.

Movable drive electrodes 9, 9, provided on the center mass 3 correspondingly to the respective fixed drive electrodes 8, are projected in the X-axial direction from the center mass 3, in an interdigitated pattern, and have plural electrode plates 9A, 9A, . . . which are engaged with the respective electrode plates 8A of the fixed drive electrodes 9.

Vibration generating portions 10, 10 are provided between the substrate 2 and the center mass 3 as vibration generators, and comprise the fixed-side drive electrodes 8 and the movable-side drive electrodes 9, respectively. In the vibration generating portions 10, an AC drive signal, together with a DC bias voltage, is applied between these drive electrodes 8 and 9, respectively, so that an electrostatic attraction is alternately generated between the electrode plates 8A and 9A. Thus, the center mass 3 is vibrated in the directions shown by arrow a1 and a2 in FIG. 1.

Fixed detection electrode 11, provided on the substrate 2, is arranged so as to face the center mass 3, as shown in FIGS. 1 to 3.

A movable detection electrode 12 is formed on the back of the center mass 3, and is opposed to the fixed detection electrode 11, defining a space between them in the Z-axial direction.

The fixed detection electrode 11 and the movable detection electrode 12 constitute a parallel plane capacitor which serves as an angular velocity detection portion 13. When the center mass 3 is displaced in the Z-axial direction, correspondingly to an angular velocity on the Y-axis, the detection portion 13 detects the angular velocity as a variation in electrostatic capacitance between the detection electrodes 11 and 12.

Next, the operation of the angular velocity sensor 1 will be described.

First, to the vibration generating portions 10 positioned on the right and left sides, AC drive signals having opposite phases are applied together with DC bias voltages, respectively. An electrostatic attractive force is alternately generated between the fixed-side drive electrodes 8 and the movable-side electrodes 9 on the right and left sides. The supporting beams 5 are deflected, so that the center mass 3 is vibrated in the directions indicated by the arrows a1 and a2 in FIG. 1.

When an angular velocity Ω on the Y axis is applied to the angular velocity sensor 1 in the above vibration state, a Coriolis force F expressed by the following numerical formula acts in the Z-axial direction. Thus, the supporting beams 5 are deflected, so that the center mass 3 is displaced in the Z-axial direction, due to the Coriolis force F.

$$F = 2M1\Omega v,$$ [Numerical Formula 1]

in which M1 is the mass of the center mass 3, Q is the angular velocity on the Y axis, and v is the velocity in the X-axial direction of the center mass 3.

Moreover, when the center mass 3 is deflected in the Z-axial direction, the gap (electrostatic capacitance) between the detection electrodes 11 and 12 of the angular velocity detecting portion 13 is varied correspondingly to the displacement. Accordingly, the angular velocity detecting portion 13 detects the variation in electrostatic capacitance as the angular velocity Ω, and outputs a detection signal corresponding to the angular velocity Ω.

Referring to the vibration state of the masses 3 and 4, for example, when the center mass 3 is displaced (vibrated) in the direction indicated by arrow a1, the supporting beams 5 are deflected in the X-axial direction, as shown by the solid lines in FIG. 4. Thus, the vibration of the center mass 3 is transmitted to the outer masses 4 via the supporting beams 5, so that the outer masses 4 are displaced in the direction indicated by the arrow a2. Moreover, when the center mass 3 is displaced in the direction indicated by the arrow a2, the supporting beams 5 are deflected in the opposite direction as shown by the imaginary lines in FIG. 4. Thus, the outer masses 4 are displaced in the direction indicated by the arrow a1.

As a result, the center mass 3 and the outer masses 4 are vibrated at opposite phases, that is, about 180° out of phase, in the resonance state. When the supporting beams 5 are deflected in this resonance state, the nodes 5A, which correspond to the nodes of the vibration, are maintained substantially at constant positions. For this reason, substantially no vibration of the masses 3 and 4 is transmitted to the substrate 2 via the supporting beams 5 and the fixing portions 6.

In this embodiment, the center mass 3 and the outer masses 4 are connected to each other via the supporting beams 5 displaceably in the X-axial direction, and the nodes 5A of the supporting beams 5 are connected to the substrate 2 via the fixing portions 6. Accordingly, when the masses 3 and 4 are vibrated above the substrate 2, the neighboring center mass 3 and the outer masses 4 can be vibrated substantially at opposite phases. Moreover, the nodes 5A, at which the supporting beams 5 can be maintained substantially at constant positions when the beams 5 are vibrated together with the masses 3 and 4, can be arranged in the middles of the respective supporting beams 5. In the positions of the nodes 5A, vibrations of the masses 3 and 4 can be canceled out with each other.

In this embodiment, the center mass 3 and the outer masses 4 are arranged substantially in a straight line in the Y-axial direction. For example, the center mass 3 is vibrated in the X-axial direction, and thereby, the vibration can be efficiently transmitted to the outer masses 4 via the supporting beams 5, and with the simple configuration, the masses 3 and 4 can be vibrated at opposite phases. Furthermore, a pair of the outer masses 4 are symmetrically arranged, sandwiching the center mass 3, and thereby, the vibration state of the masses 3 and 4 as a whole can be stabilized.

Since the fixing portions 6 support the center mass 3 and the outer masses 4 via the nodes 5A of the supporting beams 5, vibration of the masses 3 and 4 can be securely suppressed from being transmitted to the substrate 2, the masses 3 and 4 can be efficiently vibrated at predetermined amplitude, vibration velocity, and so forth without the vibration energy to be applied to the masses 3 and 4 from the vibration generating portion 10 being dissipated to the substrate 2. As a result, the masses 3 and 4 can be securely displaced by a predetermined displacement, correspondingly to the angular velocity Ω. Thus, the detection sensitivity of the sensor can be stabilized.

Moreover, when no angular velocity is applied, vibrations of the masses 3 and 4 can be prevented from being transmitted to the substrate 2, causing the substrate 2 to vibrate, which causes the masses 3 and 4 to vibrate in the Z-axial direction. The detection accuracy and reliability of the sensor can be enhanced.

Figure 5:
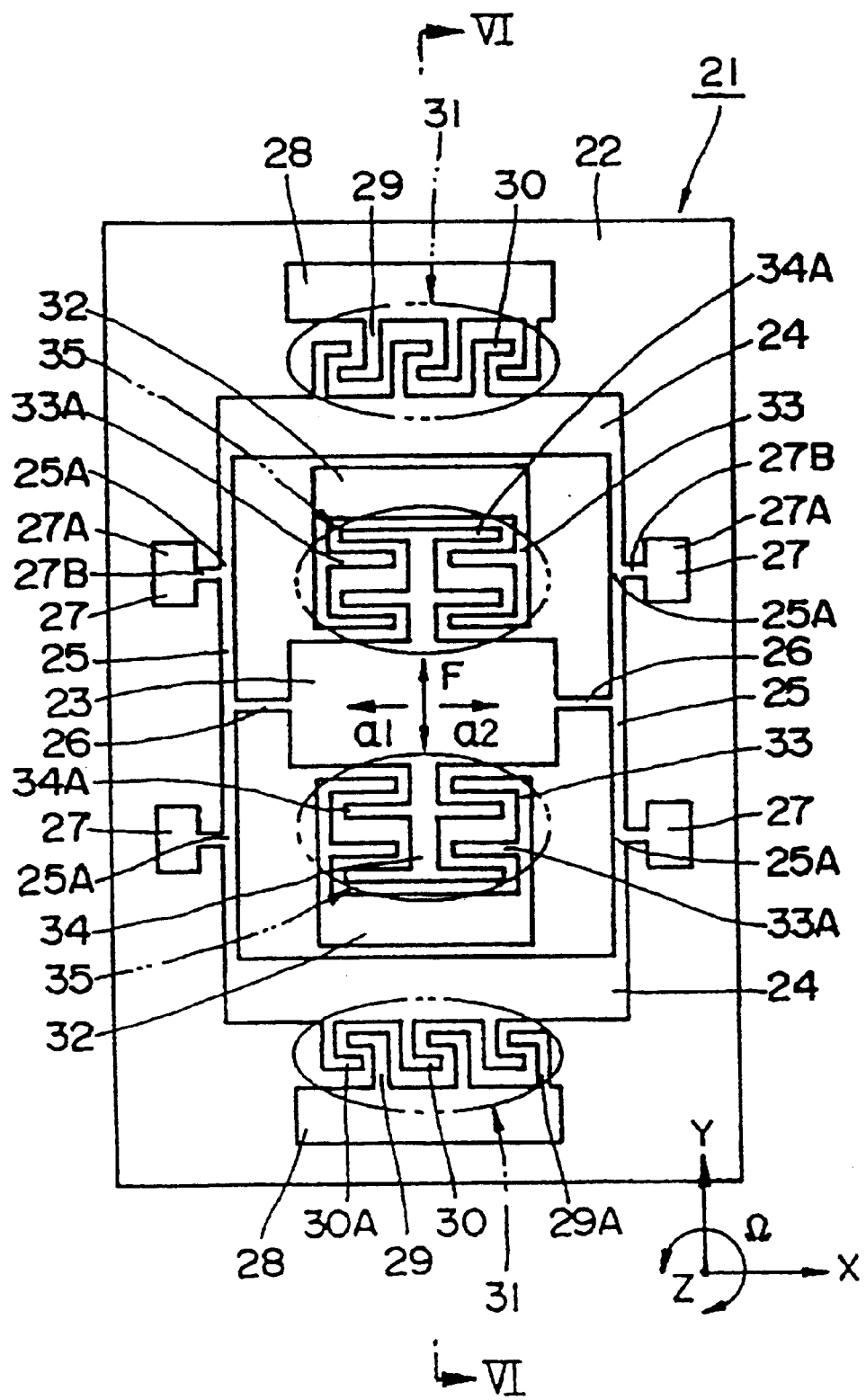
FIG. 5 is a plan view of an angular velocity sensor according to a second embodiment of the present invention.
Figure 6:
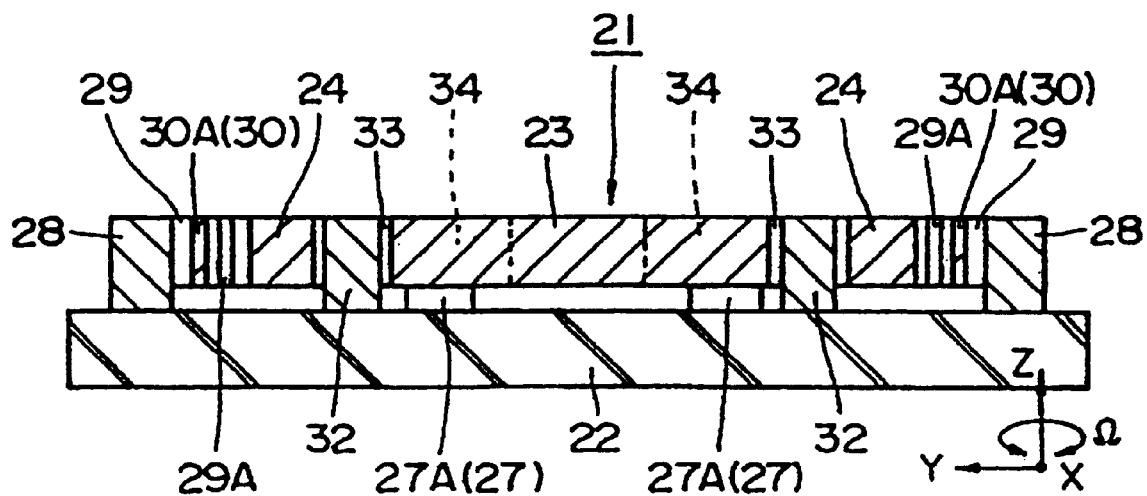
FIG. 6 is a cross sectional view of the angular velocity sensor taken along arrow VI—VI in FIG. 5.

Hereinafter, FIGS. 5 and 6 show a second embodiment of the present invention. In this embodiment, characteristically, an angular velocity sensor for detecting an angular velocity on the Z-axis is formed. Moreover, in this embodiment, elements similar to those of the first embodiment are designated by the same reference numerals, and the description thereof is omitted.

Reference numeral 21 denotes an angular velocity sensor of this embodiment. On a substrate 22 of the angular velocity sensor 21, a center mass 23, outer masses 24, supporting beams 25, mass-supporting beams 26, fixing portions 27, drive electrodes 29 and 30, detection electrodes 33 and 34, are formed, e.g., by use of a silicon material having a low resistance or the like.

The center mass 23 as a first mass, disposed near the center of the substrate 22, is connected to the outer masses 24 via the supporting beams 25 and the mass-supporting beams 26. These masses 23 and 24 are supported by the supporting beams 25 displaceably in the X-axial direction (vibration direction). Moreover, the center mass 23 is supported by the mass-supporting beams 26 in such a manner that the center mass 23 can be displaced in the Y-axial direction (detection direction).

The outer masses 24, 24 as second masses are arranged on both of the sides in the Y-axial direction of the center mass 23, and are fixed to both of the ends of the respective supporting beams 25, and can be displaced in the X-axial direction with respect to the center mass 23. These masses 23 and 24 are arranged substantially in a straight line, in the Y-axial direction in a plane parallel to the substrate 22 as shown in FIGS. 5 and 6.

The supporting beams 25, 25 e.g., two in number, connect the outer masses 24 to each other, displaceably in the X-axial direction. The respective supporting beams 25 are formed in straight line patterns having substantially the same length, and can be deflected in the X-axial direction. The supporting beams 25 are arranged on both of the right and left sides of the center mass 23, elongating in the Y-axial direction.

Similarly to the first embodiment, when the angular velocity sensor 21 is operated, the center mass 23 and the outer masses 24 are vibrated via the supporting beams 25, in the X-axial direction at opposite phases. Then, nodes 25A and 25A, which are maintained at substantially constant positions, are arranged in the middles in the longitudinal direction of the supporting beams 25, respectively.

The mass-supporting beams 26, 26 e.g.., two in number, are formed deflectably in the Y-axial direction, have a straight line pattern elongating in the X-axial direction, and connect the right and left sides of the center mass 23 to the middles in the longitudinal directions of the supporting beams 25, respectively. Moreover, the mass-supporting beams 26 support the center mass 23 between the respective supporting beams 25, displaceably in the Y-axial direction, and regulate the center mass 23 not to be displaced in the X-axial direction with respect to the middle positions of the supporting beams 25.

Fixing portions 27, 27, . . . , e.g., four in number, connect the nodes 25A of the supporting beams 25 to the substrate 22. The fixing portions 27, as well as in the first embodiment, are arranged on both of the left and right sides of the supporting beams 25, two for each side thereof, and are separated in the Y-axial direction.

The fixing portions 27 each comprise a seat 27A fixed on the substrate 22, and an arm 27B disposed so as to project from the seat 27A to the supporting beam 25 and be spaced from the substrate 22. The projecting ends of the arms 27B are connected to the nodes 25A of the supporting beams 25, respectively. Thereby, the fixing portions 27 suppress vibrations of the masses 23 and 24 from being transmitted to the substrate 22.

Moreover, drive electrode supporting portion 28,28, formed on the substrate 22, are arranged on both of the sides in the Y-axial direction of the outer masses 24.

Fixed drive electrodes 29, 29, are provided on the respective drive electrode supporting portions 28, and project from the supporting portions 28 toward the outer masses 24. Each of the fixed drive electrodes has electrode plates 29A, 29A, . . . bent in the X-axial direction so as to have an L-shaped pattern. The respective electrode plates 29A are arranged at intervals in the X-axial direction in an interdigitated pattern.

Movable drive electrodes 30, 30 are provided for the respective outer masses 24 correspondingly to the fixed drive electrodes 29, and have plural electrode plates 30A, 30A, . . . projected from the outer masses 24 in interdigitated patterns with the respective electrode plates 29A of the fixed-side drive electrodes 29.

Vibration-generating portions 31, 31 as vibration generators are provided between the substrate 22 and the outer masses 24. Each of the vibration-generating portions 31 comprises a fixed drive electrode 29, and a movable electrode 30, similarly to the first embodiment, and cause the masses 23 and 24 to vibrate in the directions indicated by the arrows a1 and a2 in FIG. 5.

Detection electrode supporting portions 32, 32, provided on the substrate 22, are arranged on both of the sides in the Y-axial direction of the center mass 23, respectively.

Fixed detection electrodes 33 and 33, provided for the respective detection electrode supporting portions 32, are formed, and have plural electrode plates 33A, 33A, . . . , formed, e.g., in a substantially F-shape, projected in the X-axial direction, and arranged in an interdigitated pattern.

The movable detection electrodes 34 and 34, provided for the center mass 23 correspondingly to the respective fixed detection electrodes 33, have plural electrode plates 34A, 34A, . . . arranged in an interdigitated pattern. The electrode plates 34A are interdigitated with the electrode plates 33A of the fixed detection electrodes 33 with spaces being interposed between them in the Y-axial direction.

Angular velocity detection portions 35, provided between the substrate 22 and the center mass 23 as an external force detection portion, constitute parallel flat-plate capacitors each of which comprises a fixed detection electrode 33 and a movable detection electrode 34. When the center mass 23 is displaced in the Y-axial direction by a Coriolis force corresponding to the angular velocity on the Z axis, the detection portions 35 detect the angular velocity as a variation in electrostatic capacitance between the detection electrodes 33 and 34.

In operation of the angular velocity sensor 21 of this embodiment, AC drive signals, together with DC bias voltages, are applied to the respective vibration generating portions 31, so that the outer masses 24 are vibrated in the directions indicated by the arrows a1 and a2 in FIG. 5, respectively. Then, the supporting beams 25 are deflected in the X-axial direction, and the vibrations of the outer masses 24 are transmitted to the center mass 23 via the supporting beams 25 and the mass-supporting beams 26. Thus, the center mass 23 is vibrated in the directions indicated by the arrows a2 and a1 at the phase opposite to that of the outer masses 24.

When the angular velocity $\Omega$ on the Z axis is added to the angular velocity sensor 21, the mass-supporting beams 26 are deflected, and thereby, the center mass 23 is displaced in the Y-axial direction correspondingly to the Coriolis force. As a result, the electrostatic capacitance of the angular velocity detection portions 35 is changed. The change in the electrostatic capacitance is detected as the angular velocity $\Omega$.

The fixing portions 27, which support the nodes 25A of the supporting beams 25, suppress the vibration of the masses 23 and 24 from being transmitted to the substrate 2.

Thus, in this embodiment, effects comparable to those of the first embodiment can be obtained. Especially, in this embodiment, the center mass 23 is connected to the supporting beams 25 by means of the mass-supporting beams 26. When no angular velocity Ω is applied, the supporting beams 25 are deflected, and thereby, the masses 23 and 24 are vibrated only in the X-axial direction. Thus, the mass-supporting beams 26 20 can be held so as not to be deflected in the Y-axial direction. Accordingly, the center mass 23 can be vibrated in the X-axial direction while displacement of the center mass 23 in the Y-axial direction is prevented. Thus, the detection accuracy can be enhanced.

Moreover, since the movable drive electrodes 30 are formed on the outer masses 24, the configuration of the center mass 23 in which the movable detection electrodes 34 are formed can be simplified.

Figure 7:
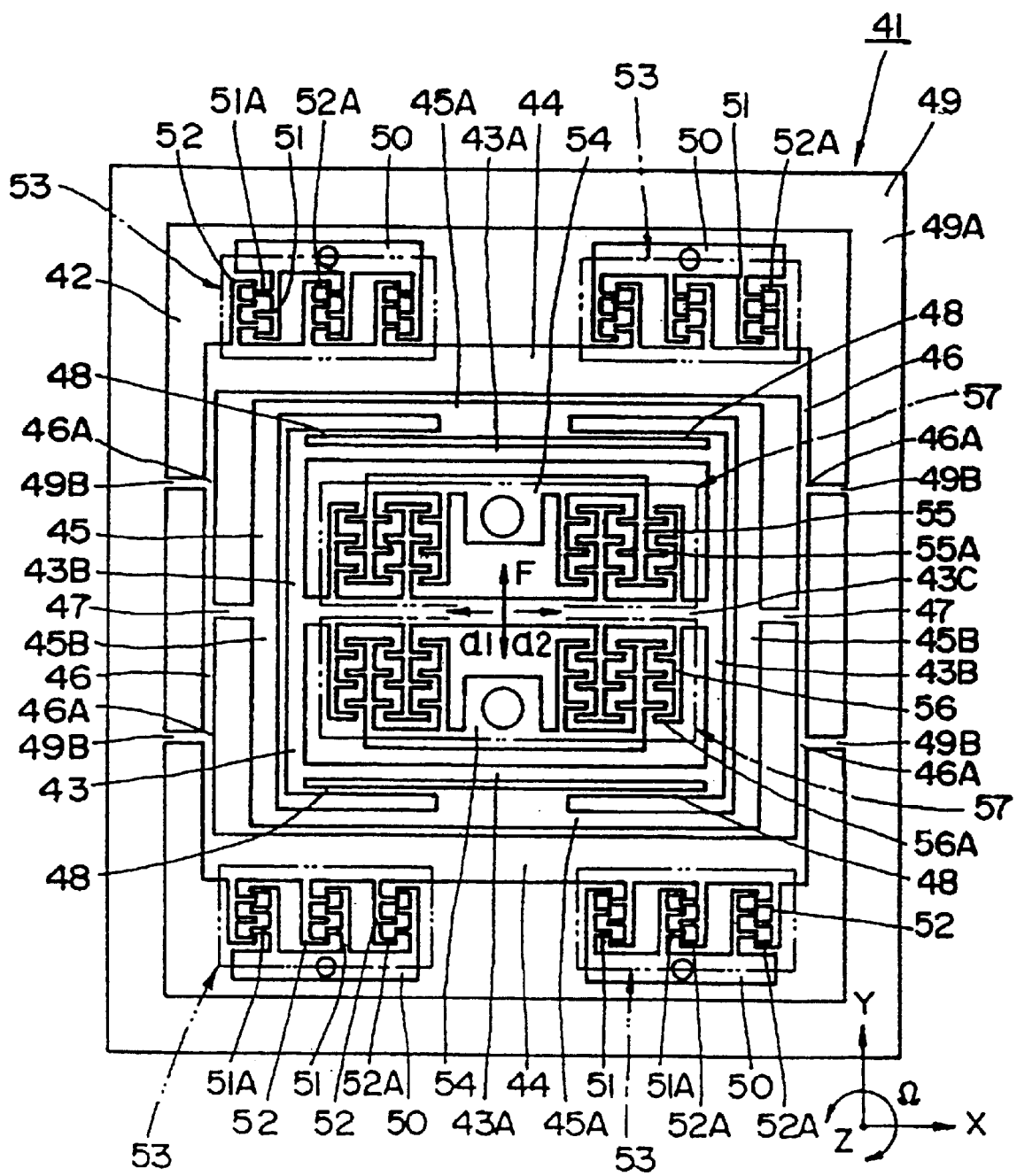
FIG. 7 is a plan view of an angular velocity sensor according to a third embodiment of the present invention.
Figure 8:
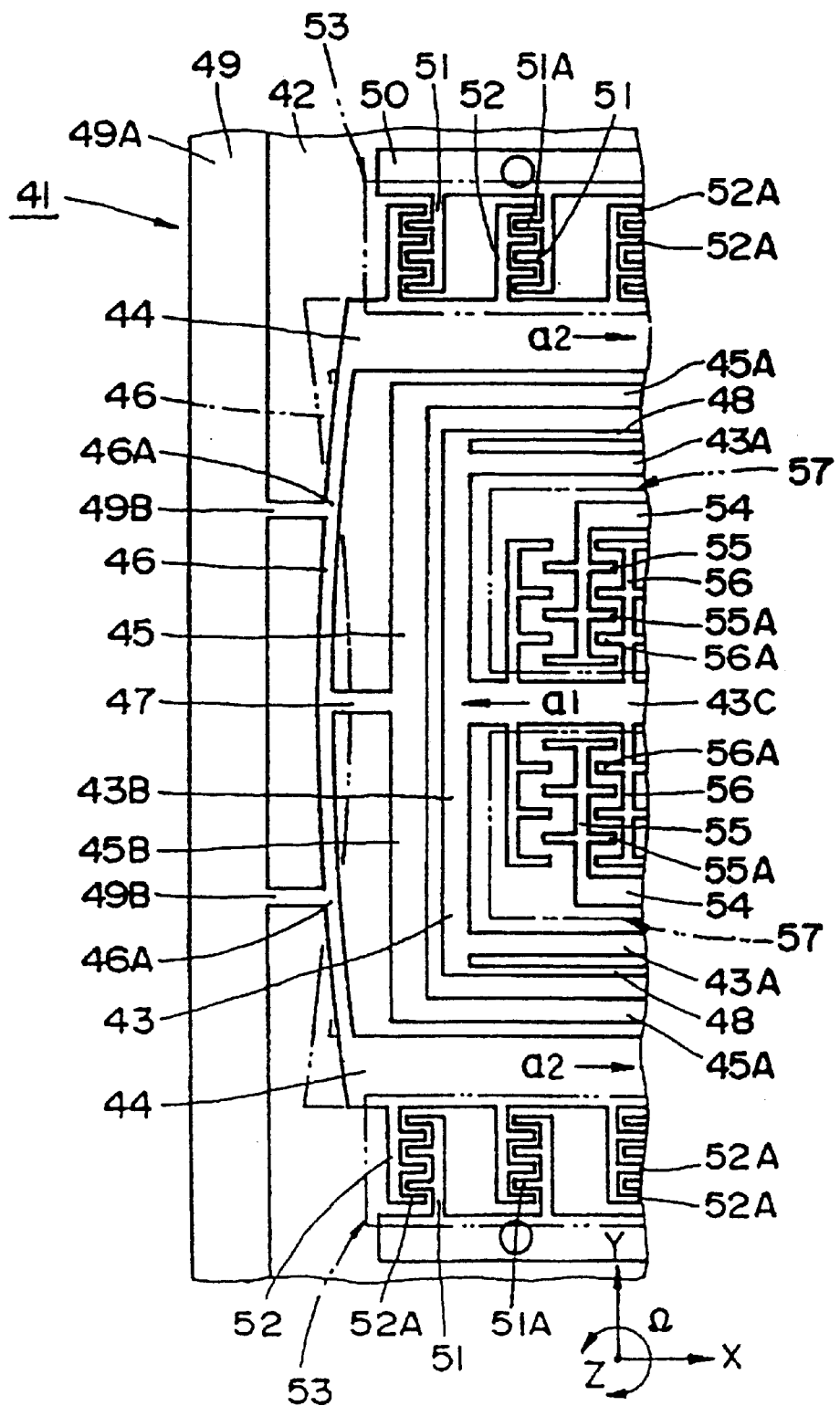
FIG. 8 is an enlarged, fragmentary view of an essential part of the angular velocity sensor in which the center mass and the frame-shaped mass are vibrated at a phase opposite to that of the outer masses.

FIGS. 7 and 8 illustrate a third embodiment of the present invention. In this embodiment, characteristically, a third mass is provided between first and second masses. In this embodiment, elements similar to those in the first embodiment are designated by the same reference numerals, and the description thereof is omitted.

An angular velocity sensor 41 of this embodiment and the substrate 42 of the angular velocity sensor 41 are shown in FIGS. 7 and 8. On the substrate 42, a center mass 43, outer masses 44, frame-shaped masses 45, supporting beams 46, connecting portions 47, mass-supporting beams 48, a fixing portion 49, drive electrodes 51 and 52, detection electrodes 55 and 56, are formed.

The center mass 43, arranged near the center of the substrate 42, comprises lateral frame portions 43A and 43A elongating in opposition to each other in the Y-axial direction, longitudinal frame portions 43B and 43B connecting both of the ends of the respective lateral frame portions 43A, and an intermediate frame portion 43C positioned between the lateral frame portions 43A.

The center mass 43 is connected to the outer masses 44 and the frame-shaped mass 45 via the supporting beam 46, the connecting portions 47, and the mass-supporting beams 48. These masses 43, 44, and 45 are supported by the supporting beam 46 displaceably in the X-axial direction (vibration direction), and moreover, are arranged substantially in a straight line along the Y-axial direction in a plane parallel to the substrate 22. Moreover, the center mass 43 is supported by the mass-supporting beams 48 displaceably in the Y-axial direction (detection direction).

The outer masses 44, 44, are arranged on both of the sides in the Y-axial direction of the center mass 43, and are fixed to both of the end sides of the respective supporting beams 46, and can be displaced in the X-axial direction with respect to the center mass 43 and the frame-shaped mass 45.

The frame-shaped mass 45 as a third mass, is arranged between the center mass 43 and the respective outer masses 44, and is formed of a rectangular frame-shaped mass surrounding the center mass 43. The frame-shaped mass 45 comprises lateral frame portions 45A and 45A elongating in the X-axial direction in opposition to each other, longitudinal frame portions 45B and 45B elongating in the Y-axial direction and connecting both of the ends of the respective lateral frame portions 45A which form a rectangular shape. The inner sides of the frame-shaped mass 45 are connected to the center mass 43 via the mass-supporting beams 48. The outer sides of the frame-shaped mass 45 are connected to the supporting beams 46 via the connecting portions 47.

The supporting beams 46, 46, e.g., two in number, connect the outer masses 44 to each other displaceably in the X-axial direction. The respective supporting beams 46 are formed in a straight line pattern having substantially the same length, and can be deflected in the X-axial direction.

Furthermore, the supporting beams 46 are arranged on both of the right and left sides of the frame-shaped mass 45, elongating in the Y-axial direction.

When the angular velocity sensor 41 is operated, the center mass 43 (frame-shaped mass 45) and the outer masses 44 are vibrated via the supporting beams 46 substantially at opposite phases in the X-axial direction. At the middles in the lengthwise direction of the supporting beams 46, nodes 46A and 46A are provided, which are held substantially at constant positions.

The respective connecting portions 47 are formed so as to have a high rigidity, and regulate displacement of the frame-shaped mass 45 in the Y-axial direction with respect to the supporting beams 46.

The mass-supporting beams 48, e.g., four in number, connect the center mass 43 to the frame-shaped mass 45. One of the ends of the respective mass-supporting beams 48 are connected to the four corner of the center mass 43, and the other ends thereof are elongated in the X-axial direction and connected to the lateral frame portions 45A, respectively, and can be deflected in the Y-axial direction. The mass-supporting beams 48 support the center mass 43 displaceably in the Y-axial direction, and regulate displacement of the center mass 43 in the X-axial direction within the frame-shaped mass 45.

Respective fixing portions 49 connect the nodes 46A of the supporting beams 46 to the substrate 42, and comprise respective seats 49A, 49A formed of a rectangular framing body surrounding the masses 43, 44, and 45 and fixed to the substrate 42, and arms 49B, 49B, . . . , e.g., four in number, disposed, separated from the substrate 42.

The arms 49B are arranged on both of the right and left sides of the respective supporting beams 46, two for each of the right and left sides, and are separated from each other in the Y-axial direction. Moreover, projecting ends of the arms 49B are connected to the nodes 46A of the supporting beams 46, similarly to the first embodiment, and thereby, the fixing portions 49 suppress vibration of the masses 43, 44, and 45 from being transmitted to the substrate 42.

Moreover, drive electrode supporting portions 50, 50, . . . , e.g., four in number, are fixedly formed on the substrate 42. The drive electrode supporting portions 50 are arranged on both of the sides of the outer masses 44 so as to sandwich them in the Y-axial direction, two for each of the sides thereof.

Fixed drive electrodes 51, 51, . . . are provided for the respective drive electrode supporting portions 50, and have plural electrode plates 51A, 51A, . . . projecting in the X-axial direction and arranged in the Y-axial direction at intervals in an interdigitated pattern.

Movable drive electrodes 52, 52, . . . are provided from the outer masses 44 correspondingly to the fixed drive electrodes 51. The movable drive electrodes 52 each have plural electrode plates 52A, 52A, . . . projecting in the X-axial direction in an interdigitated pattern with the electrode plates 51A of the respective fixed drive electrode 51.

Vibration-generating portions 53, 53, . . . are provided between the substrate 42 and the outer masses 44. The vibration generating portions 53 each comprise the fixed drive electrode 51 and the movable drive electrode 52, and generate an electrostatic force between the electrode plates 51A and 52A so that the outer masses 44 are vibrated in the direction indicated by the arrow a1 and a2 in FIG. 7.

Two detection electrode supporting portions 54 and 54 are formed on the substrate 42, positioned inside of the center mass 43.

The plural fixed detection electrodes 55, 55, . . . are provided for each of the detection electrode supporting portions 54. Each of the fixed detection electrodes 55 has plural electrode plates 55A, 55A, . . . projecting in the X-axial direction and arranged in an interdigitated pattern at intervals in the Y-axial direction.

The plural movable detection electrodes 56, 56, are provided for the center mass 43 correspondingly to the respective fixed detection electrodes 55. Each of the electrodes 56 has plural electrode plates 56A, 56A, . . . projecting in the X-axial direction in an interdigitated pattern with the plural electrode plates 56A, 56A, . . . of the fixed detection electrode 55, defining a gap between then in the Y-axial direction.

Angular velocity detection portions 57, 57 are provided between the substrate 42 and the center mass 43 as external force detectors. The angular velocity detection portion 57 comprises a fixed detection electrode 57 and a movable detection electrode 56. The angular velocity detection portion 57 forms a parallel flat plate capacitor in which the electrostatic capacitance between the electrode plates 55A and 56A is changed when the frame-shaped mass 45 is displaced in the Y-axial direction, due to the angular velocity Ω on the Z axis.

The operation of the angular velocity sensor 41 will now be described.

When an AC drive signal, together with a DC bias voltage, is applied to the respective vibration generating portions 53, the outer masses 44 are vibrated in the directions indicated by the arrows a1 and a2 in FIG. 8. Then, the supporting beams 46 are deflected in the X-axial direction, and the vibration of the outer masses 44 is transmitted to the frame-shaped mass 45. Thereby, the frame-shaped mass 45, integrally with the center mass 43, is vibrated at the phase opposite to that of the outer masses 44, in the directions indicated by the arrows a1 and a2.

When an angular velocity Ω is applied to the angular velocity sensor, the mass-supporting beams 48 are deflected, and thereby, the center mass 43 is displaced in the Y-axial direction correspondingly to the Coriolis force inside the frame-shaped mass 45. As a result, the electrostatic capacitance of the angular velocity detection portions 57 is changed. The change in the electrostatic capacitance is detected as an angular velocity Ω.

Moreover, since the respective arms 49B of the fixing portions 49 support the nodes 46A of the supporting beams 46, the vibration of the masses 43, 44, and 45 are prevented from being transmitted to the substrate 42.

Thus, in this embodiment constituted as described above, operation and effects similar to those of the above-described first embodiment can be obtained. In particular, in the configuration of this embodiment, the frame-shaped mass 45 is formed between the center mass 43 and the outer masses 44. Therefore, when no angular velocity Ω is applied, the center mass 43 can be vibrated only in the X-axial direction inside of the frame-shaped mass 45.

Accordingly, the frame-shaped mass 45 prevents deflection of the supporting beams 46 is converted to a displacement in the Y-axial direction, which is transmitted to the center mass 43. Thus, the detection accuracy can be further enhanced.

Figure 9:
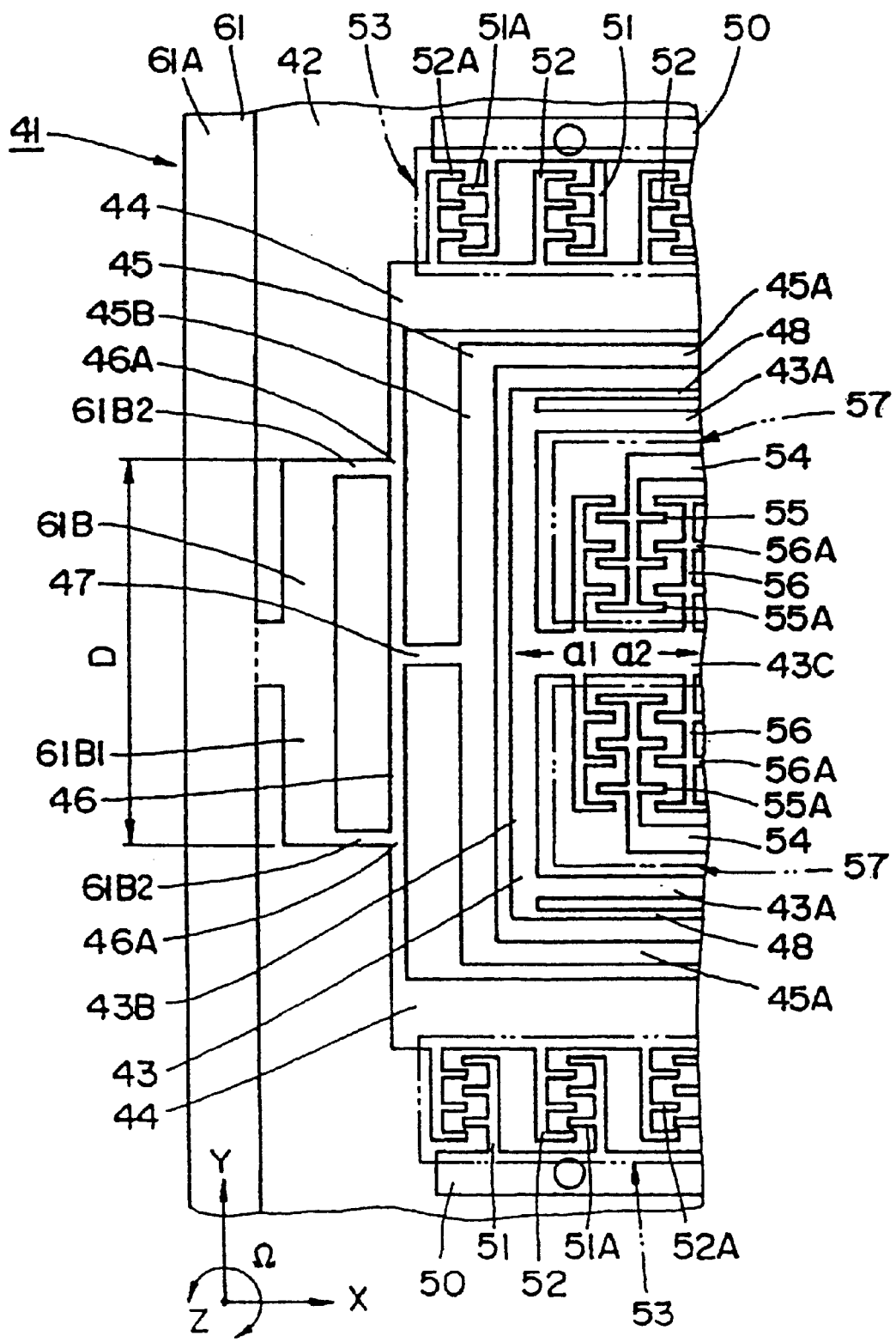
FIG. 9 is an enlarged, fragmentary view of an angular velocity sensor according to a fourth embodiment of the present invention, viewed from the same position as that employed in FIG. 8.

Next, FIG. 9 illustrates a fourth embodiment of the present invention. Characteristically, in this embodiment, a forked arm is provided on a fixing portion. In this embodiment, elements similar to those of the third embodiment are designated by the same reference numerals, and the description is omitted.

A fixing portion 61 connects the respective nodes 45A of the supporting beam 46. The fixing portion 61 comprises a frame-shaped seat 61A fixed on the substrate 42, and an arm 61B formed on the inner side of the seat 61A, similarly to the third embodiment.

The arm 61B comprises a branched portion 61B1 of which the base is fixed to one point of the seat 61A, and on the top side thereof, is branched substantially into a T-shape, and supporting protuberances 61B2 and 61B2 for protruding from the top side of the branched portion 61B in the X-axial direction, and supporting the nodes 46A of the supporting beam 46. These branched portion 61B and the supporting protuberances 61B2 are separated from the substrate 42.

Thus, in this embodiment configured as described above, operation and effects similar to those of the third embodiment can be obtained. Especially, in this embodiment, the branched portion 61B1 of the fixing portion 61 has a fork shape. Therefore, the base side of the branched portion 61B1 can be fixed to only one point of the seat 61A (substrate 42).

Accordingly, even if the size D of the substrate 42 between the nodes 46A of the supporting beam 46 is changed, due to thermal expansion, thermal shrinkage, and so forth of the substrate 42, a stress acting in such a direction that the interval between the nodes 46A is increased or reduced is prevented from being applied from the substrate 42 to the arm 61B, the supporting beam 46, and so forth. Thus, the reliability can be enhanced.

Next, FIGS. 10 to 13 illustrate a fifth embodiment of the present invention. In the configuration of this embodiment, characteristically, when both an angular velocity and an acceleration are applied to the angular velocity sensor, the angular velocity is detected, separate from the acceleration. In this embodiment, elements similar to those of the first embodiment are designated by the same reference numerals, and the description thereof is omitted.

Reference numeral 71 designates an angular velocity sensor 71 of this embodiment. On the substrate 72 of the angular velocity sensor 72, a center mass 73, outer masses 74 and 75, supporting beams 76, mass-supporting beams 77 and 78, fixing portions 79, drive electrodes 81 and 82, fixed detection electrodes 85 and 86, movable detection electrodes 87, 88, 89, and 90, are formed, e.g., by use of a silicon material having a low resistance.

In the angular velocity sensor 71, capacitors C1, C2, C3, and C4 (see FIG. 13), which are formed of the fixed detection electrodes 65 and 86, the movable detection electrodes 87, 88, 89, and 90, are formed in substantially the same electrode pattern.

Figure 10:
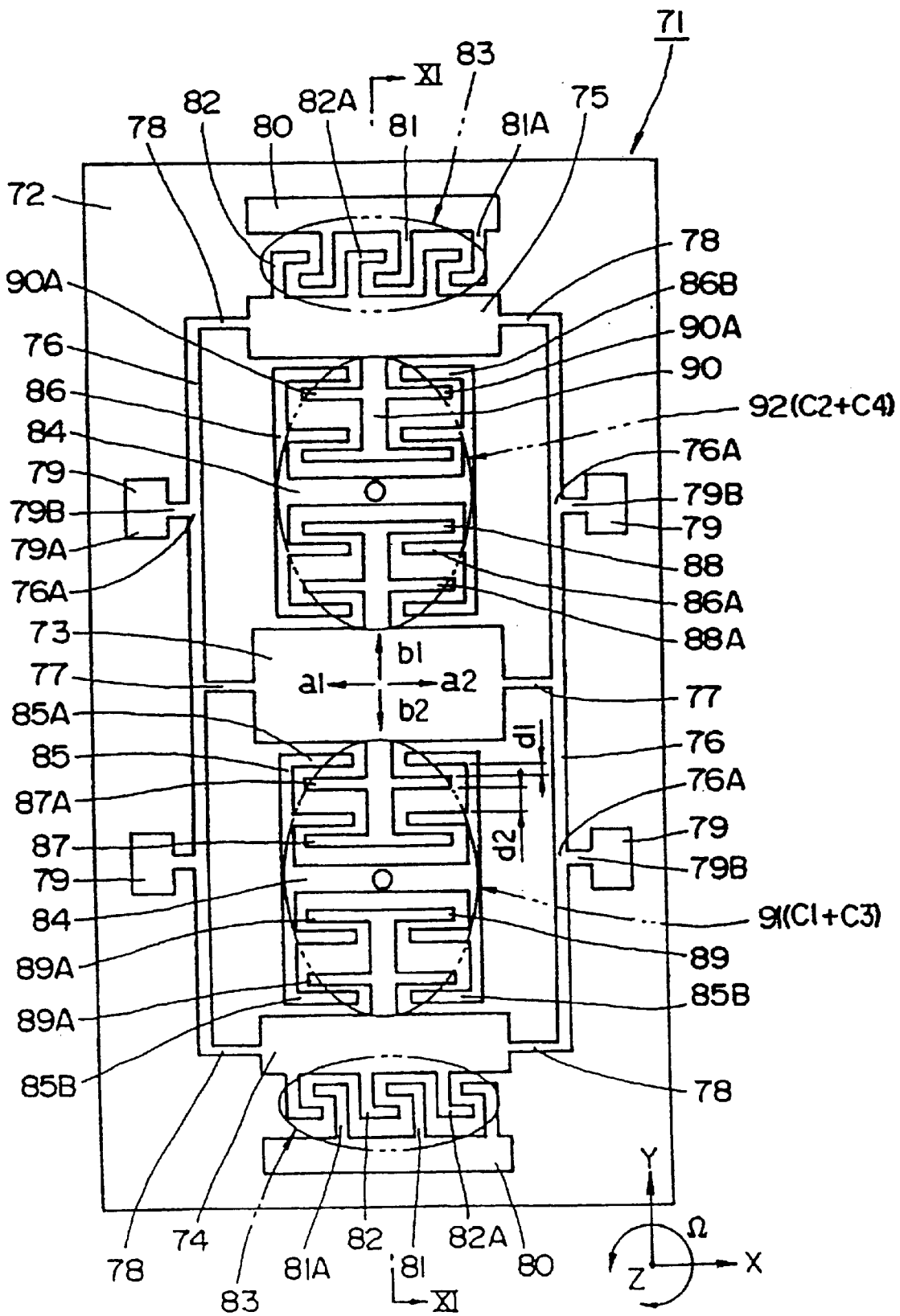
FIG. 10 is a plan view according to a fourth embodiment of the present invention.
Figure 11:
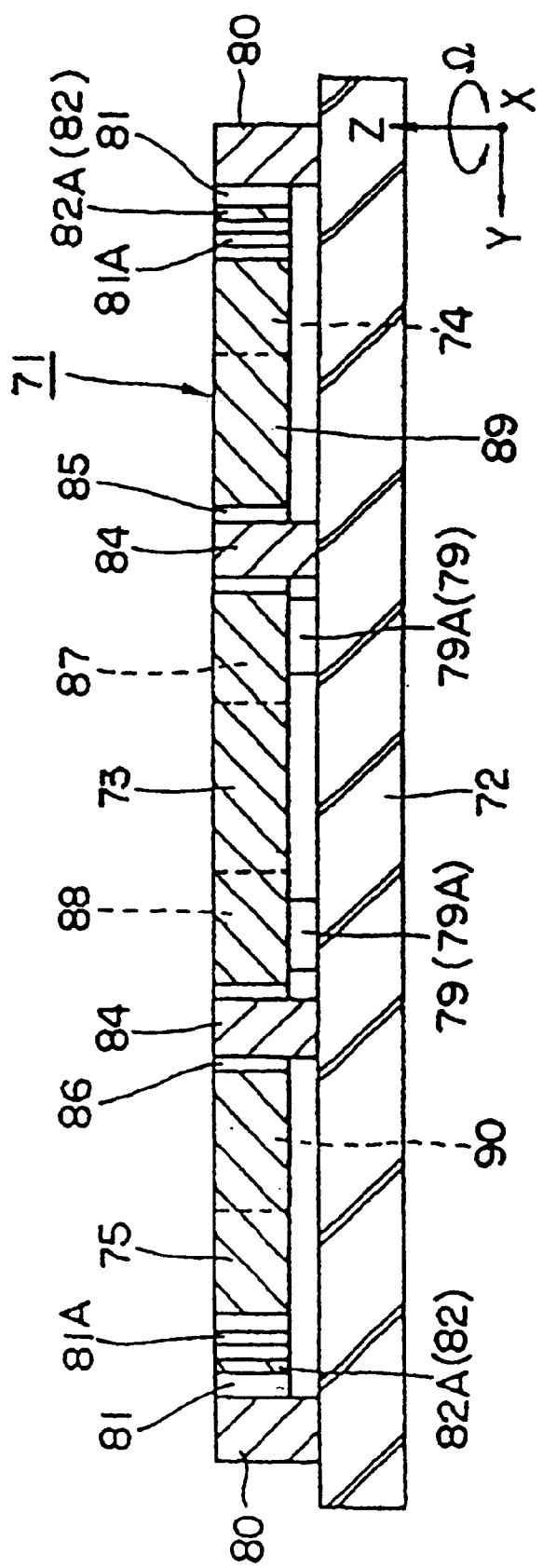
FIG. 11 is a cross sectional view of the angular velocity sensor taken along arrow XI—XI in FIG. 10.
Figure 12:
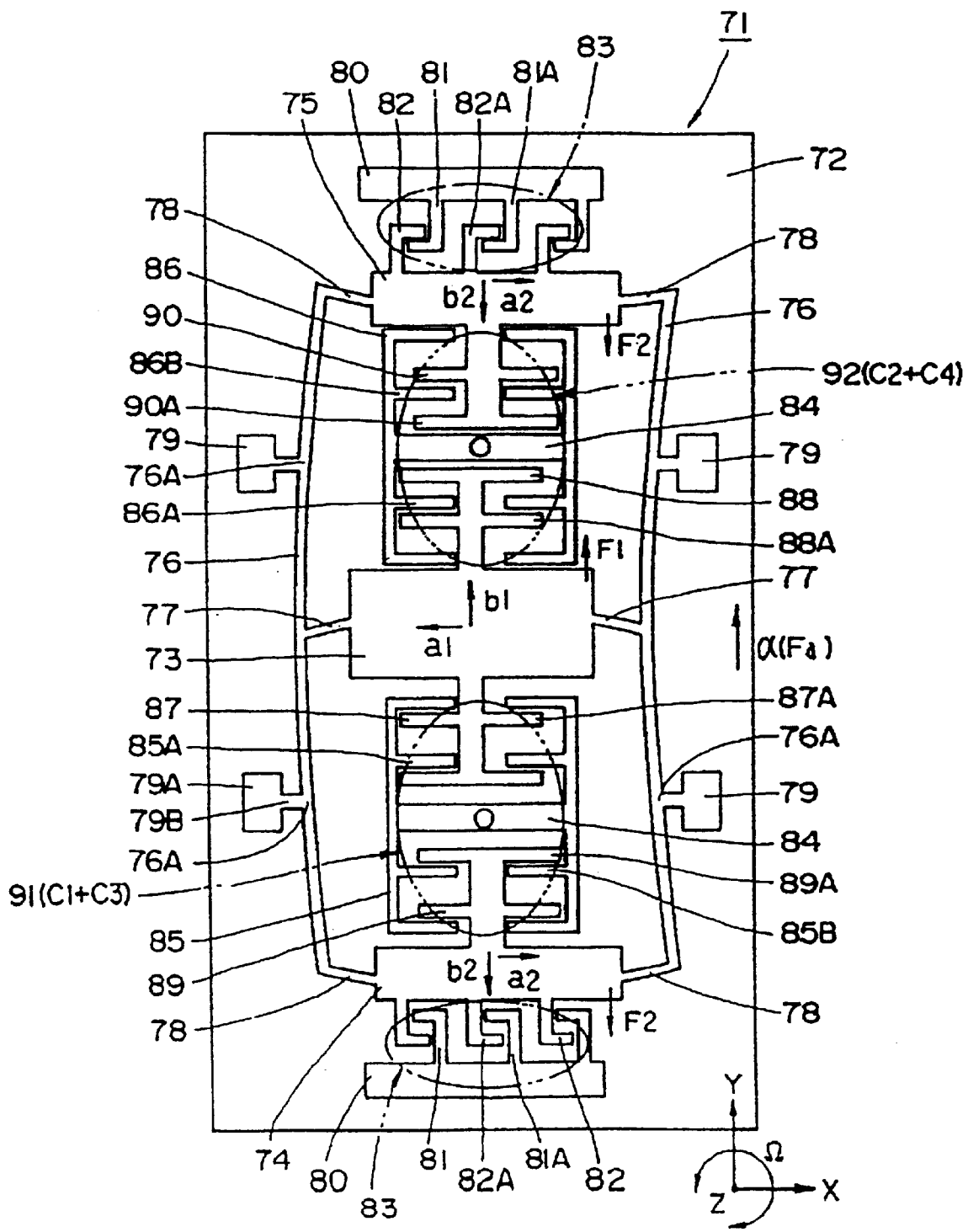
FIG. 12 is a plan view showing that the center mass and the outer masses are displaced in opposite directions, caused by an angular velocity.

The center mass 73 as a first mass, arranged near the center of the substrate 72, is formed, e.g., in a rectangular flat plate shape. The center mass 73 is connected to the outer masses 74 and 75 via the supporting 76 and the mass-supporting beams 77 and 78. These masses 73, 74, and 75 are arranged substantially along a straight line in the Y-axial direction in a flat plane parallel to the substrate 72 as shown in FIGS. 10 and 11. When an external force such as an angular velocity, an acceleration, and so forth is applied, as described later, the Coriolis force or inertia corresponding to the external force is applied to the center mass 73, and thereby, the center mass 73 is displaced in the Y-axial direction via the mass-supporting beams 77.

The outer masses 74 and 75 as second masses are arranged on both of the front and rear sides of the center mass 73 in the Y-axial direction. The outer masses 74 and 75 are formed, for example, in a rectangular flat plate shape, and are connected to both of the ends of the respective supporting beams 78, respectively. Similarly to the center mass 73, the outer masses 74 and 75, when an external force such as an angular velocity, an acceleration, and so forth is applied, is displaced in the Y-axial direction via the mass-supporting beams 78.

The masses of the masses 73, 74, and 75, and the spring constants of the supporting beams 77 and 78 are set, and the masses 73, 74, and 75 and the supporting beams 77 and 78 are so configured, that when the masses 73, 74, and 76 are displaced together at an angular velocity Ω and an acceleration α as described later, these displacements are substantially equal to each other.

The supporting beams 76 and 76, e.g., two in number, are arranged on both of the right and left sides of the center mass 73, and are formed deflectably in the X-axial direction, elongating in the Y-axial direction, substantially at the same length.

When the angular velocity sensor 71 is operated, the center mass 73 and the outer masses 74 and 75 which are neighboring to each other are vibrated in the X-axial direction at opposite phases. When the center mass 73 is displaced in the direction indicated by the arrow a1, caused by the vibration, the outer masses 74 and 75 are displaced in the direction indicated by the arrow a2. In this case, four nodes 76A are arranged, which are held at constant positions in the middles of the supporting beams 76 in the longitudinal direction.

The first mass supporting beams 77, 77 are formed deflectably in the Y-axial direction. The respective first mass-supporting beams 77 connect both of the right and left sides of the center mass 73 to the middles in the longitudinal directions of the supporting beams 76, respectively, and support the center mass 73 displaceably in the Y-axial direction.

The second mass-supporting beams 78, 78 are formed deflectably in the Y-axial direction. The second mass-supporting beams 78 connect both of the right and left sides of the outer masses 74 and 75 to the ends of the supporting beams 76, respectively, and support the masses 74 and 75 displaceably in the Y-axial direction.

The fixing portions 79, 79, . . . , e.g., four in number, connect the nodes 76A of the supporting beams 76 to the substrate 72. Each of the fixing portions 79 comprises a seat 79A and an arm 79B, similarly to that of the first embodiment. The fixing portions 79 support the supporting beams 76 at the nodes 76A, and thereby, suppress vibration of the masses 73, 74, and 75 from being transmitted to the substrate 72 side.

The drive electrode supporting portions 80, 80 are provided on both of the front and rear sides of the outer masses 74 and 75. The fixed drive electrodes 81 and 81 are provided on the respective drive electrode supporting portions 80, and have plural electrode plates 81A arranged in an interdigitated pattern, respectively.

The movable drive electrode 82 and 82 are provided on the outer masses 74 and 75 correspondingly to the respective drive electrodes 81. Each of the movable drive electrodes 82 has plural electrode plates 82A engaged in interdigitatedly with the electrode plates 81A of the fixed drive electrode 81.

Vibration generating portions 83 and 83 as vibration generators are provided between the substrate 72 and the outer masses 74 and 75. The vibration generating portions 83 comprise a fixed drive electrode 81 and a movable drive electrode 82, respectively, and vibrate the outer masses 74 and 75 in the directions indicated by the arrows a1 and a2 in FIG. 10.

Detection electrode supporting portions 84 and 84, e.g., two in number, are provided on the substrate 72, and are positioned on both of the front and rear sides of the center mass 73, arranged between the outer masses 74 and 75.

Fixed detection electrode 85 are projected from one of the detection electrode supporting portions 84 toward the front and back sides, and has plural electrode plates 85A disposed on the center mass 73 side, and plural electrode plates 85B disposed on the outer mass 74 side. These electrode plates 85A and 85B are arranged in an interdigitated pattern, respectively.

A fixed-side detection electrode 86 is projected from the detection electrode supporting portion 84 toward the front and rear sides, and has plural electrode plates 86A disposed on the center mass 73 side, and plural electrode plates 86B disposed on the outer mass 75 side.

The movable detection electrode 87 projects toward one of the fixed detection electrode 85. The movable detection electrode 87 has plural electrode plates 87A engaged with the electrode plates 85A of the fixed detection electrode 85, and constitutes, together with the fixed-side detection electrode 85, a parallel flat plate capacitor C1.

In this case, regarding the movable detection electrode 87, the electrode interval d1 provided on one side in the Y-axial direction of the electrode plate 87A is formed so as to be shorter than the electrode interval d2 on the other side (d1<d2), as seen in FIG. 10. In the configuration, the electrode interval d1, which exerts a large influence over the electrostatic capacitance of the capacitor C1, is increased when the center mass 73 is displaced as shown by arrow b1 in the Y-axial direction, and is decreased when the center mass 73 is displaced as shown by arrow b2. Thereby, the electrostatic capacitance of the capacitor C1 is increased when the center mass 73 is displaced in the direction shown by the arrow b1, and is decreased when the center mass 73 is displaced in the direction by the arrow b2.

The movable detection electrode 88 is projected from the center mass 73 toward the other fixed detection electrode 86. The movable detection electrode 88 has plural electrode plates 88A engaged with the electrode plates 86A of the fixed detection electrode 86, and constitute, together with the fixed-side detection electrode 86, a capacitor C2, similarly to the movable detection electrode 87.

The electrostatic capacitance of the capacitor C2 is set so as to increase or decrease contrarily to the capacitor C2 with respect to the displacement direction of the center mass 73. That is, in the configuration, when the center mass 73 is displaced in the b1 direction, the electrostatic capacitance is decreased, and when the center mass 73 is displaced in the b2 direction, the electrostatic capacitance is increased.

The second movable detection electrode 89 is provided on one of the external masses 74 and 75, that is, the mass 74. The movable detection electrode 89 has plural electrode plates 89A engaged with the electrode plates 85B of the fixed detection electrode 85 in the Y-axial direction, sandwiching gaps, and constitute, together with the fixed detection electrode 85, a capacitor C3.

In this case, the movable detection electrode 89 is arranged on the side opposite to the movable detection electrode 87 in the Y-axial direction, sandwiching the fixed-side detection electrode 85 (detection electrode supporting portion 84). In this configuration, the electrostatic capacitance of the capacitor C3 is decreased when the outer mass 74 is displaced in the b1 direction, and is increased when the outer mass 74 is displaced in the b2 direction.

The second movable detection electrode 90 is provided for the other outer mass 75. The electrode plates 90A of the movable-side detection electrode 90, together with the electrode plates 86B of the fixed-side detection electrode 86, form a capacitor C4, similarly to the movable-side detection electrode 89. Furthermore, the electrostatic capacitance of the capacitor C4 is increased when the outer mass 75 is displaced in the b1 direction, and is decreased when the outer mass 75 is displaced in the b2 direction.

An angular velocity detection portion 91 as an external detector is provided between the substrate 72 and the masses 73 and 74. The angular velocity detection portion 91 comprises one of the fixed detection electrodes 85 and 86, that is, the fixed detection electrode 85, and the movable detection electrodes 87 and 89. The capacitors C1 and C3 are arranged in parallel to each other. In operation of the angular velocity sensor 71 is operated, when the masses 73 and 74 are displaced in the Y-axial direction as described later, the electrostatic capacitance of the whole of the angular velocity detection portion 91 is changed.

The other angular velocity detection portion 92 as an external detector is provided between the substrate 72 and the masses 73 and 75. The angular velocity detection portion 92 comprises the other of the fixed detection electrodes 85 and 86, that is, the fixed detection electrode 86, and the movable detection electrodes 88 and 90. The capacitors C2 and C4 are arranged in parallel to each other. The angular velocity sensor 92 is configured so that the masses 73 and 75 are displaced in the Y-axial direction, so that the electrostatic capacitance is changed.

Thus, the angular velocity detection portion 91 combines displacements of the masses 73 and 74 as a change in capacitance of the capacitors C1 and C3. The angular velocity detection portion 92 combines displacements of the masses of the 73 and 75 as a change in capacitance of the capacitors C2 and C4, and thereby, the angular velocity sensor 71 detects the angular velocity $\Omega$, separately from the acceleration $\alpha$, as described later.

The operation of the angular velocity sensor 71 will now be described.

First, In operation of the angular velocity sensor 71, an AC current drive signal, together with a DC bias voltage, is applied to the respective vibration generating portions 83. Then, the supporting beams 76 are deflected in the X-axial direction, respectively, and thereby, the center mass 73 and the outer masses 74 and 75 are vibrated in the directions shown by the arrows a1 and a2 at opposite phases to each other.

Moreover, when the angular velocity $\Omega$ on the Z axis is applied to the angular velocity sensor 71, for example, a Coriolis force F1 is added to the angular velocity sensor 71 in the direction shown by the arrow b1. To the outer masses 74 and 75, which are vibrated in the velocity direction opposite to that of the center mass 73, a Coriolis force F2 in the opposite direction corresponding to the velocity direction is added in the direction shown by the arrow b2.

As a result, for example, the center mass 73 is displaced via the mass supporting beams 77 in the direction shown by the arrow b1, and the outer masses 74 and 75 are displaced via the mass-supporting beams 78 in the direction shown by the arrow b2. These displacements cause the electrostatic capacitances of the angular velocity detection portions 91 and 92 to change. Moreover, if an acceleration $\alpha$ in the Y-axial direction is simultaneously added in this state, an inertial force Fa corresponding to the acceleration $\alpha$ is added to the masses 73, 74, and 75.

Figure 13:
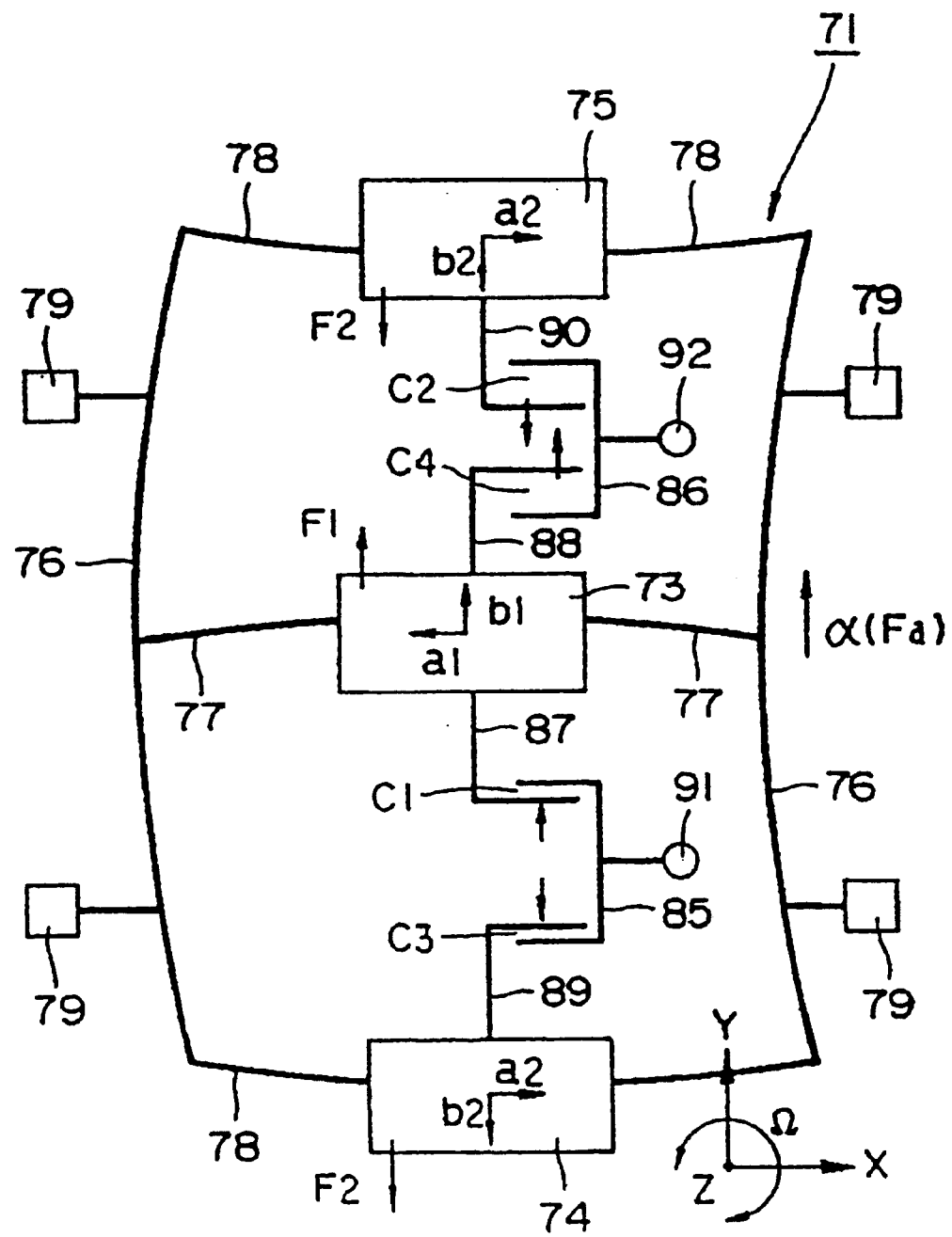
FIG. 13 is an explanatory view schematically showing the angular velocity sensor of FIG. 12.

Then, changes in electrostatic capacitance of the angular velocity detection portions 91 and 92 will be described with reference to FIG. 13.

First, the angular velocity $\Omega$ and the acceleration $\alpha$ are added to the masses 73, 74, and 75. In the angular velocity detection portion 91, for example, the masses 73 and 74 are displaced in the directions shown by the arrows b1 and b2, due to the Coriolis forces F1 and F2. Thereby, the electrode intervals of the capacitors C1 and C3 are reduced as compared with the initial states thereof, so that the electrostatic capacitances thereof are increased, respectively. Here, the case in which the Coriolis forces F1 and F2 each are larger than the inertial force Fa is described by way of an example.

In this case, both of the Coriolis force F1 and the inertial force Fa act on the center mass 73 in such a direction as to increase the electrostatic capacitance of the capacitor C1. Accordingly, the change amount $\Delta C1$ in electrostatic capacitance of the capacitor C1 is the sum of an angular velocity component $\Delta Cw$ and an acceleration component $\Delta Ca$ as expressed by numerical formula 2, in which $\Delta Cw$ ($\Delta Cw \geqq 0$) is the variation component by the angular velocity $\Omega$ of a variation in electrostatic capacitance of the capacitor C1, and $\Delta Ca$($\Delta Ca \geqq 0$) is the variation component caused by the inertial force Fa thereof.

$$\Delta C1 = \Delta Cw + \Delta Ca \qquad \text{[Numerical Formula 2]}$$

Moreover, the Coriolis force F2 applied to the outer masse 74 acts on the capacitor C3 in such a direction that the electrostatic capacitance is increased, and the inertial force Fa acts on the capacitor C3 in the direction opposite to the Coriolis force F2. Therefore, a variation $\Delta C3$ in electrostatic capacitance of the capacitor C3 is equal to the sum of the angular velocity component $\Delta w$ and the acceleration component ($-\Delta Ca$), as expressed by the following numerical formula 3.

$$\Delta C3 = \Delta Cw - \Delta Ca. \qquad \text{[Numerical Formula 3]}$$

Accordingly, a variation $\Delta CA$ in electrostatic capacitance of the whole of the angular velocity detection portion 91 is calculated according to the following numerical formula 4, so that the acceleration components $\Delta Ca$ of the capacitors C1 and C3 are canceled out. Thus, the variation $\Delta CA$ in the electrostatic capacitance has the value corresponding to the angular velocity component $\Delta Cw$.

$$\Delta CA = \Delta C1 + \Delta C3 = \Delta Cw + \Delta Ca + \Delta Cw - \Delta Ca$$
$$= 2\Delta Cw \qquad \text{[Numerical Formula 4]}$$

Referring to the angular velocity detection portion 92, for example, the masses 73 and 75 in the angular velocity detection portion 92 are displaced in the directions shown by the arrows b1 and b2, due to the Coriolis forces F1 and F2. Thereby, both of the electrode intervals of the capacitors C2 and C4 are increased as compared with the initial states thereof, so that the electrostatic capacitances are reduced, respectively.

In this case, both of the Coriolis force F1 and the inertial force Fa, applied to the center mass 73, increase the electrode intervals to act on the capacitor C2 in such a direction that the electrostatic capacitance is decreased. Thus, the variation DC2 is equal to the sum of the angular velocity component ($-\Delta Cw$) and the acceleration component ($-\Delta Ca$).

$$\Delta C2 = -\Delta Cw - \Delta Ca \qquad \text{[Numerical Formula 5]}$$

The Coriolis force F2 applied to the outer mass 75 acts on the capacitor C4 in such a direction that the electrostatic capacitance is decreased. The inertial force Fa acts in the direction opposite to that of the Coriolis force F2. Therefore, the variation $\Delta C4$ is equal to the sum of the angular velocity component ($-\Delta Cw$) and the acceleration $\Delta Ca$, as expressed by the following numerical formula 6.

$$\Delta C4 = -Cw + \Delta Ca$$

Accordingly, when the variation $\Delta CB$ in electrostatic capacitance of the whole of the angular velocity detection portion 92 is calculated from the following numerical formula 7, the acceleration components ΔCa of the capacitors C2 and C4 are canceled out, so that the variation ΔCB in electrostatic capacitance has the value corresponding to the angular velocity component ΔCw only, similarly to the angular velocity detection portion 91.

$$\Delta CB = \Delta C2 + \Delta C4 = -Cw - \Delta Ca - \Delta Cw + \Delta Ca = -2\Delta Cw \quad \text{[Numerical Formula 7]}$$

In operation of the angular velocity sensor 71, signals corresponding to the variations ΔCA and ΔCB in electrostatic capacitance are output from the angular velocity detection portions 91 and 92. By processing these signals by means of a differential amplifier or the like, the angular velocity Ω can be accurately detected.

If the inertial force Fa is larger than each of the Coriolis forces F1 and F2, the outer masses 74 and 75 are displaced in the direction shown by the arrow b1. Also, in this case, the acceleration components ΔCa are canceled out. Therefore, the angular velocity Ω can be detected. Moreover, similarly, in the case in which an acceleration a in the direction shown by the arrow b2 is added to the angular velocity sensor 71, the angular velocity Ω can be detected, separately from the acceleration a.

Thus, also in this embodiment having the above-described configuration, similar operation and effects to those of the first and second embodiments can be obtained.

Especially, in the configuration of this embodiment, the angular velocity detection portion 91 which detect displacements of the masses 73 and 74 as variations in capacitance of the capacitors C1 and C3 in the combined state, and the angular velocity detection portion 92 which detect displacements of the masses 73 and 75 as variations in capacitance of the capacitors C2 and C4 in the combined state are provided.

Accordingly, the angular velocity detection portions 91 and 92, even if not only the angular velocity Ω on the Z axis but also the acceleration a on the Y-axis is applied 20 to the angular velocity sensor 71, can cancel out variations in electrostatic capacitance, caused by the acceleration a and securely eliminate them. The angular velocity Ω can be stably detected with the angular velocity Ω being separated from the acceleration a, and moreover the detection accuracy can be more enhanced.

Here, in the angular velocity detection portion 91, the capacitors C1 and C3 having the fixed-side detection electrode 85 and the movable detection electrodes 87 and 89 opposed to each other are connected in parallel, and variations in electrostatic capacitance of these capacitors C1 and C3 are detected in parallel. Moreover, in the angular velocity detection electrode 92, the capacitors C2 and C4 having the movable detection electrodes 88 and 90 opposed to each other are connected in parallel, and variations in electrostatic capacitance of the capacitors C2 and C4 are detected in parallel. Thus, in the variations in the electrostatic capacitances corresponding to the angular velocity Ω and the acceleration a, the acceleration components ΔCa of the capacitors C1 and C3, and moreover, those of the capacitors C2 and C4 can be securely canceled out, respectively. Only the angular velocity component ΔCw can be detected by means of the simple electrode configuration, not carrying out complicate operation processing.

Next, FIGS. 14 to 17 illustrate a sixth embodiment of the present invention. In this embodiment, characteristically, the external force measuring device is configured so that an angular velocity and an acceleration are individually measured. In this embodiment, elements similar to those of the first embodiment are designated by the same reference numerals, and the description is omitted.

Reference numeral 101 denotes an external force sensor of this embodiment. On the substrate 102 of the external force sensor 101, a center mass 103 described later, outer masses 104 and 105, frame-shaped masses 106 and 107, supporting beams 108, mass-supporting beams 109 and 110, connecting portions 111, a fixing portion 112, drive electrodes 114 and 115, fixed-side detection electrodes 118, 119, 120, and 121, movable-side detection electrodes 122, 123, 124, and 125, are formed.

Figure 14:
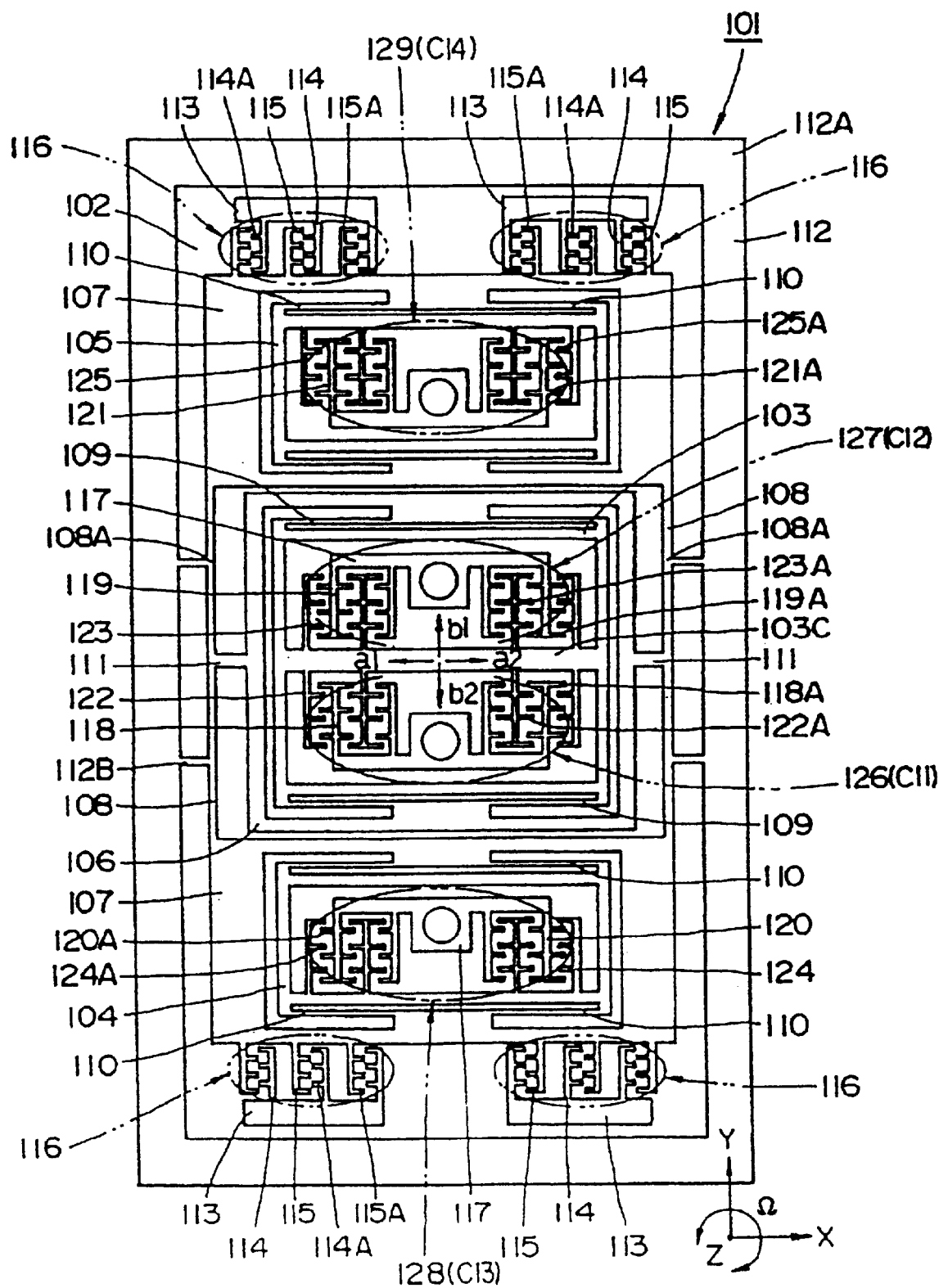
FIG. 14 is a plan view showing an external force sensor according to a sixth embodiment of the present invention.
Figure 15:
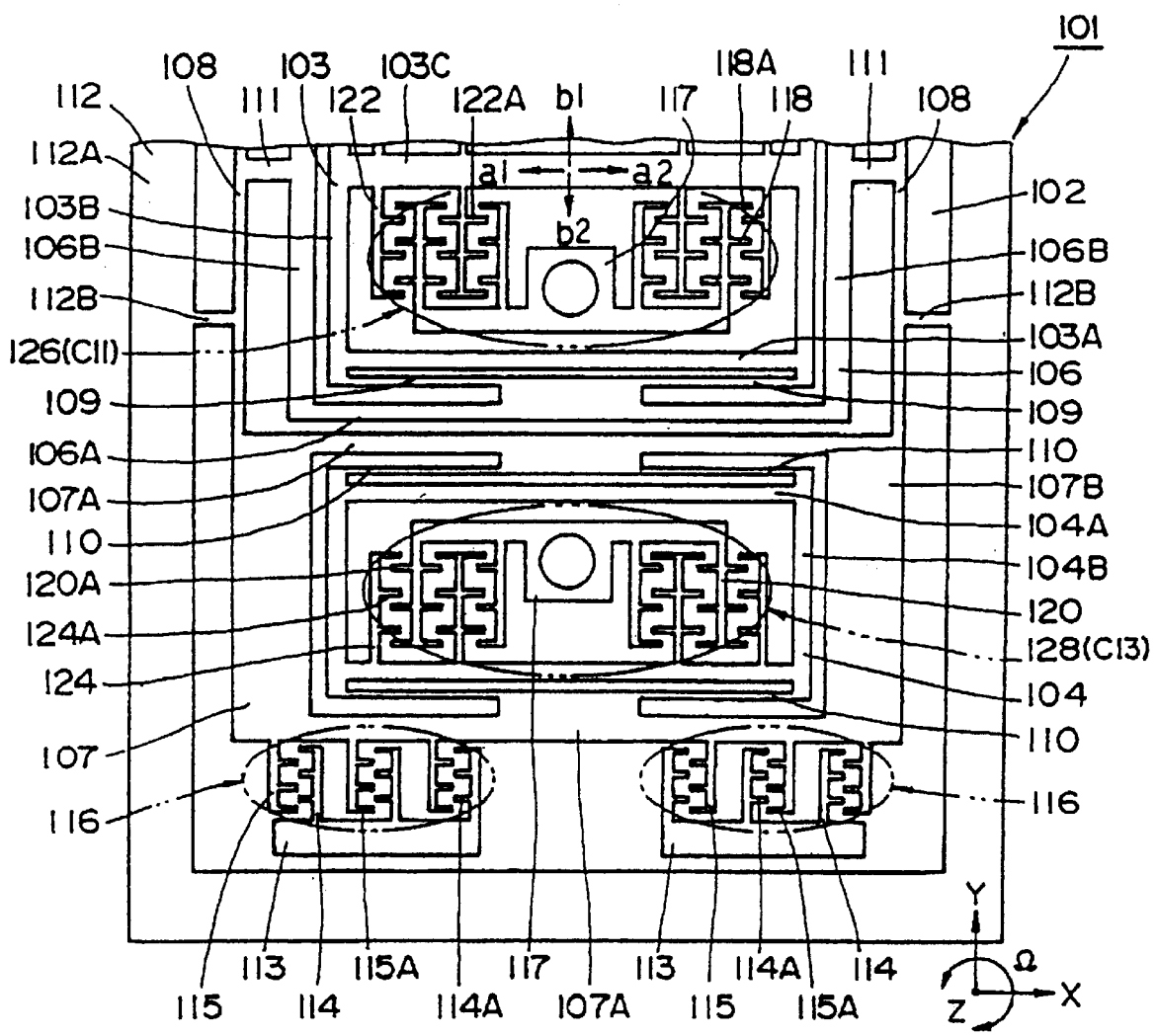
FIG. 15 is an enlarged, fragmentary view showing a part of the external force sensor.

The center mass 103 as a first mass is disposed near the center of the substrate 102, and is formed in a frame pattern, as shown in FIGS. 14 and 15, similarly to that of the third embodiment. The center mass 103 comprises lateral frame portions 103A, longitudinal frame portions 103B, and an intermediate frame portion 103C.

The center mass 103 is connected to the outer masses 104 and 105 and the frame-shaped masses 106 and 107 via the supporting beams 108, the mass-supporting beams 109 and 110, and the connecting portions 111. These masses 103, 104, 106, and 107 are supported by the supporting beams 108 displaceably in the X-axial direction, and arranged substantially in a straight line along the Y-axial direction. Moreover, the center mass 103 is supported by the mass-supporting beams 109 displaceably in the Y-axial direction.

A pair of the outer masses 104 and 105 as second masses are arranged on both of the sides in the Y-axial direction of the center mass 103. The outer mass 104 is formed of a quadrangular frame pattern having lateral frame portions 104A and longitudinal frame portions 104B as shown in FIG. 15. Also, the outer mass 105 is formed of a frame pattern similar to that of the outer masse 104. The outer masses 104 and 105 are supported by the mass-supporting beams 110 displaceably in the Y-axial direction.

The frame-shaped mass 106 as a third mass is arranged between the center mass 103 and the outer masses 104 and 105. The frame-shaped mass 106 is formed of a rectangular frame-shaped mass surrounding the center mass 103, similarly to that of the third embodiment, and has lateral frame portions 106A and longitudinal frame portions 106B. The outside portion of the frame-shaped mass 106 is connected to the supporting beams 108 via the connecting portions 111, while the inside portion thereof is connected to the center mass 103 via the mass-supporting beams 109.

The frame-shaped masses 107 and 107 as fourth masses are arranged so as to surround the outer masses 104 and 105, respectively. Each of the frame-shaped masses 107 is formed of a quadrangular frame-shaped mass having lateral frame portions 107A and longitudinal frame 107B. The outside portion is connected to the supporting beams 108, and the inside portion is connected to the outer masses 104 and 105 via the mass-supporting beams 110.

The supporting beams 108 and 108 support the masses 103 to 107 displaceably in the X-axial direction. The respective supporting beams 108 are displaced on both of the right and left sides of the frame-shaped mass 106, elongating in the Y-axial direction. When the external force sensor 101 is operated, the masses 103 and 106 and the masses 104, 105, and 107 are vibrated via the supporting beams 108 and so forth substantially at opposite phases in the X-axial direction. Here, in the middles in the longitudinal direction of the respective supporting beams 108, four nodes 108A are arranged which are held substantially at constant positions.

The first mass-supporting beams 109, 109, . . . connect the center mass 103 to the frame-shaped masse 106. The respective first mass-supporting beams 109 support the outer masses 104 and 105 in the four corners thereof displaceably in the Y-axial direction.

The second mass supporting beams 110, 110, . . . connect the outer masses 104 and 105 to the respective frame-shaped masses 107. The mass-supporting beams 110 support the outer masses 104 and 105 displaceably in the Y-axial direction.

Reference numerals 111 and 111 designate connecting portions provided on the eight and left sides, which connect the frame-shaped mass 106 to the supporting beams 108, and are formed so as to have a high rigidity, and regulate the frame-shaped mass 106 to be displaced in the Y-axial direction.

The fixing portion 112 connects the supporting beams 108 to the substrate 102. The fixing portion 112 comprises a frame-shaped seat 112A fixed on the substrate 102 and arms 112B, e.g., four in number, protruding from the seat 112A toward the inside of the seat 112A and connected to the nodes 108A of the supporting beam 108, and suppresses vibration of the masses 103 to 107 from being transmitted.

Drive electrode supporting portions 113, 113, . . . , e.g., four in number, formed on the substrate 102, are positioned on both of the front and rear sides of the outer masses 104 and 105. The fixed drive electrodes 114, 114, . . . are provided for the respective drive electrode supporting portions 113. The electrode plates 114A of each fixed drive electrode 114 are interdigitatedly engaged with the electrode plates 115A of the movable-side drive electrodes 115, 115, . . . provided for each of the frame-shaped masses 107.

Vibration generating portions 116, 116, . . . are formed of the drive electrodes 114 and 115 as vibration generator. The respective vibration generating portions 116 vibrate the outer masses 104 and 105 in the directions shown by the arrows a1 and a2.

Detection electrode supporting portions 117, 117, . . . , e.g., four in number, formed on the substrate 102, are positioned inside the masses 103, 104, and 105. For the detection electrode supporting portions 117, the fixed detection electrodes 118, 119, 120, and 121 having the plural electrode plates 118A, 119A, 120A, and 121A are provided, respectively.

The movable detection electrodes 122 and 123 are provided so as to project from the intermediate frame portion 103C of the center mass 103 toward the front and rear sides. The movable detection electrodes 124 and 125 are provided on the inner edges of the outer masses 104 and 105 so as to project therefrom. The electrode plates 122A, 123A, 124A, and 125A of the movable detection electrodes 122, 123, 124, and 125 are interdigitatedly engaged with the electrode plates 118A, 119A, 120A, and 121A of the fixed-side detection electrodes 118, 119, 120, and 121, respectively.

First displacement-detecting portions 126 and 127 constitute an external force detecting portion 130 which will be described later. One of the first displacement-detecting portions 126 and 127, that is, the detecting portion 126 comprises the fixed-side detection electrodes 118 and the movable-side detection electrodes 122. These electrodes constitute a capacitor C11 of which the electrostatic capacitance is increased when the center mass 103 is displaced in the direction shown by the arrow b1, and is decreased when the center mass 103 is displaced in the direction shown by the arrow b2.

The other displacement detecting portion 127 comprises the detection electrodes 119 and 123. These electrodes constitute a capacitor C12 of which the electrostatic capacitance is decreased when the center mass 103 is displaced in the direction shown by the arrow b1, and is increased when the center mass 103 is displaced in the direction shown by the arrow b2.

Second displacement-detecting portions 128 and 129 constitute an external force detecting portion 130. One of the first displacement-detecting portions 128 and 129, that is, the detecting portion 128 comprises the fixed-side detection electrodes 120 and the movable-side detection electrodes 124. These electrodes constitute a capacitor C13 of which the electrostatic capacitance is decreased when the outer mass 104 is displaced in the direction shown by the arrow b1, and is increased when the outer mass 104 is displaced in the direction shown by the arrow b2.

The other displacement-detecting portion 129 comprises the detection electrodes 121 and 125. These electrodes constitute a capacitor C14 of which the electrostatic capacitance is increased when the outer mass 105 is displaced in the direction shown by the arrow b1, and is decreased when the outer mass 105 is displaced in the direction shown by the arrow b2.

Figure 16:
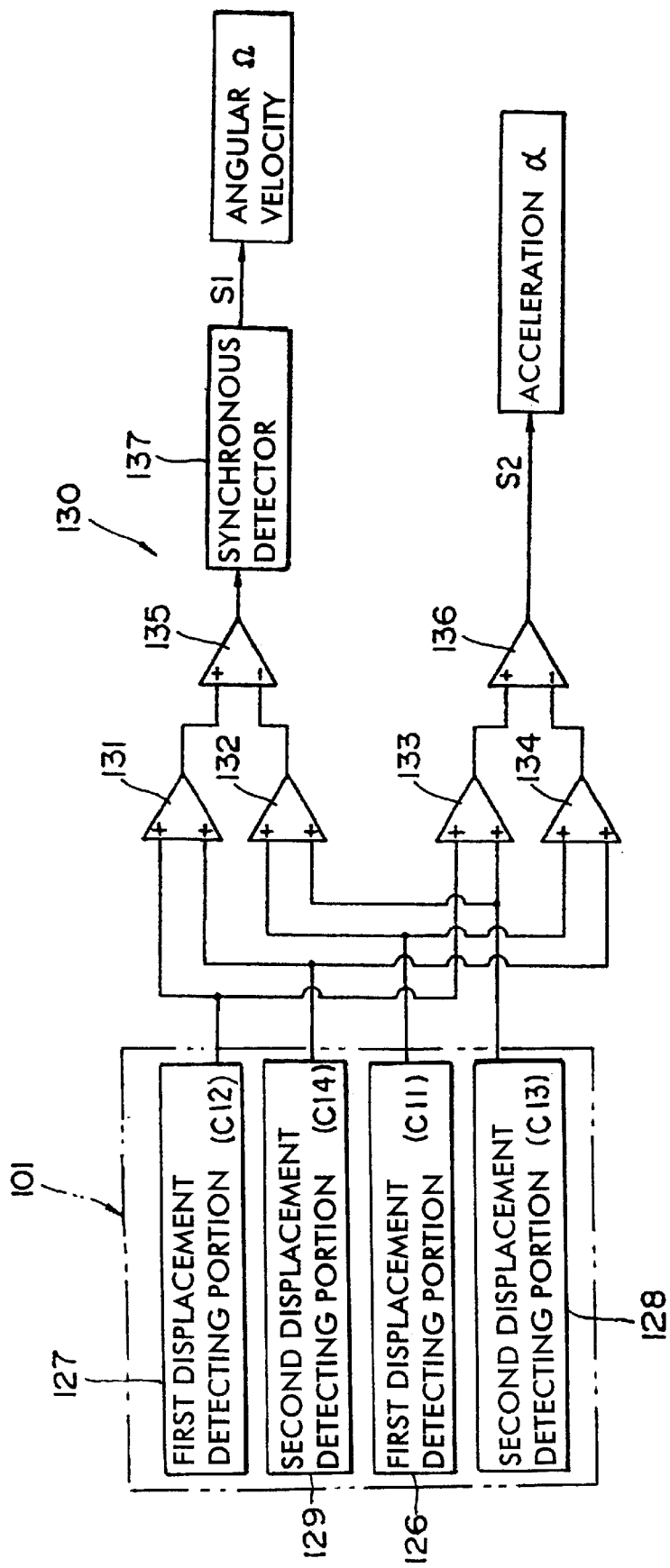
FIG. 16 illustrates the configuration of an external force operation section connected to the external force sensor.

Referring to FIG. 16, an external force detecting portion 130 as an external force detecting means detects an angular velocity $\Omega$ and an acceleration $\alpha$ applied to an external force sensor 101. The external force detecting portion 130 comprises four displacement-detecting portions 126, 127, 128, and 129, and adder amplifiers 131, 132, 133, 134, and differential amplifiers 135 and 136 as external force operating units connected to the external force sensor 101.

Here, the adder amplifier 131 add variations in electrostatic capacitance of the capacitors C12 and C14, detected by the displacement-detecting portions 127 and 129, to output it to the differential amplifier 135. Moreover, the adder amplifier 132 add variations in electrostatic capacitance of the capacitors C11 and C13, detected by the displacement-detecting portions 126 and 128, to output it to the differential amplifier 135. The adder amplifier 133 add variations in electrostatic capacitance of the capacitors C12 and C13, detected by the displacement-detecting portions 127 and 128, to output it to the differential amplifier 136. Moreover, the adder amplifier 134 add variations in electrostatic capacitance of the capacitors C11 and C14, detected by the displacement-detecting portions 126 and 129, to output it to the differential amplifier 136.

Moreover, the differential amplifier 135 outputs the difference between the output signals from the adder amplifiers 131 and 132 as a detection signal corresponding to the angular velocity $\Omega$ to a synchronous detector 137. The synchronous detector 137 synchronously rectifies and integrates the detection signals at the constant period corresponding to the vibration frequency of, e, g, the vibration generating portions 116, so that noise or the like are eliminated. The differential amplifier 136 outputs the difference between the output signals from the adder amplifiers 133 and 134 as a detection signal corresponding to the acceleration a.

Figure 17:
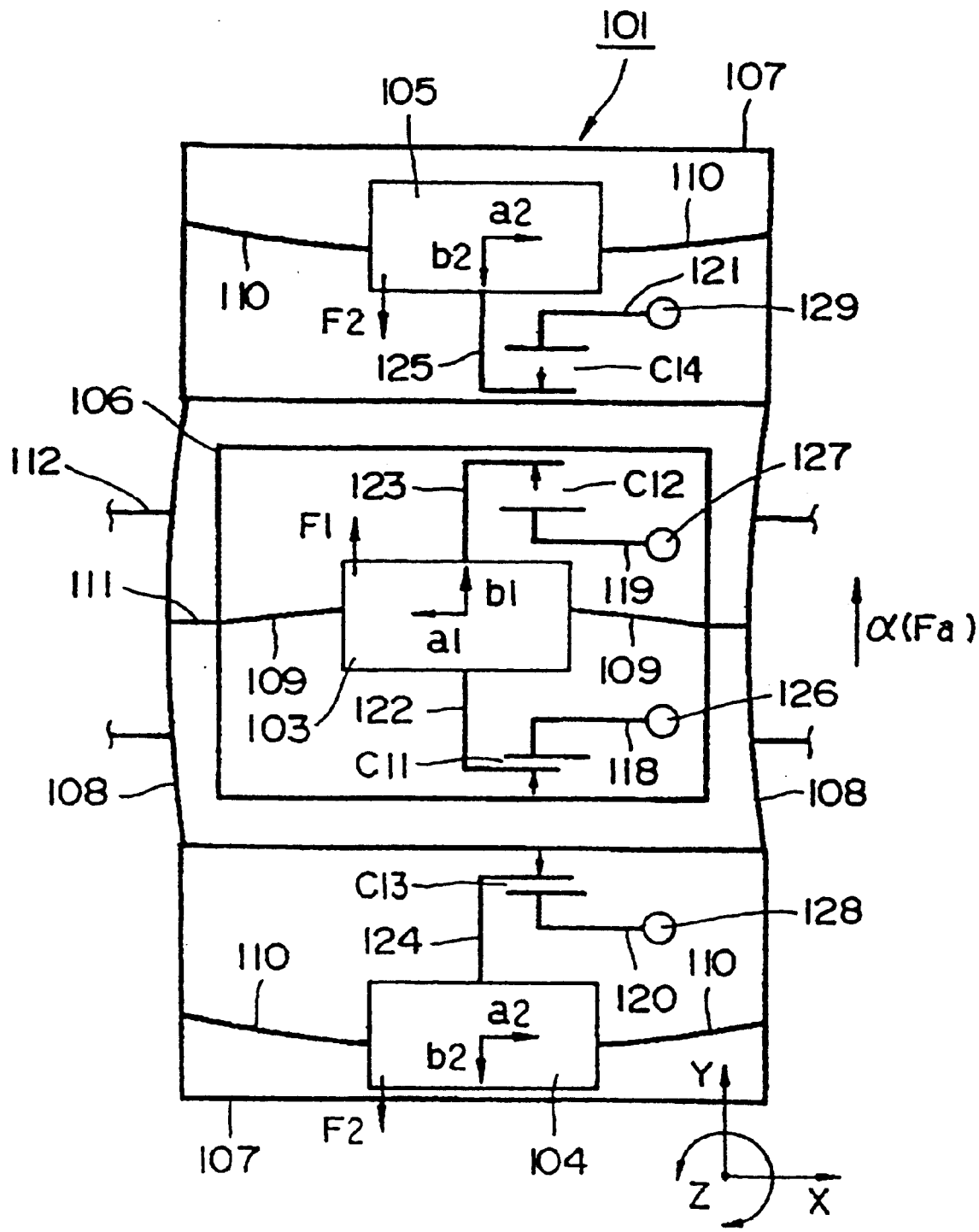
FIG. 17 is an explanatory view showing the state in which the center mass and the outer masses of the external force sensor are displaced in opposite directions to each other, caused by an angular velocity.

Detection operation of the external force sensor 101 will now be described with reference with FIG. 17.

First, when the external force sensor 101 is operated, the masses 103 and 106 and the masses 104, 105, and 107 are vibrated in the directions shown by the arrows a1 and a2 at opposite phases via the supporting beams 108.

Then, when the angular velocity $\Omega$ and the acceleration $\alpha$ are applied to the external force sensor 101, to the center mass 103, e.g., a Coriolis force F1 caused by the angular velocity $\Omega$ is added in the direction shown by the arrow b1. To the outer masses 104 and 105, a Coriolis force F2 in the direction opposite to that of the Coriolis force F1 is added in the direction shown by the arrow b2. To the masses 103, 104, and 105, an inertial force Fa caused by the acceleration $\alpha$ is added in the direction shown by the arrow b1.

Here, when each of the Coriolis forces F1 and F2 is larger than the inertial force Fa, the center mass 103 is displaced in the arrow b1 direction via the mass-supporting beams 109, the outer masses 104 and 105 are displaced in the arrow b2 direction via the mass-supporting beams 110, and simultaneously, the electrostatic capacitances of the displacement-detecting portions 126, 127, 128, and 129 are varied.

In this case, both of the Coriolis force F1 and the inertial force Fa applied to the center mass 103 acts on the displacement-detecting portion 126 in such a direction that the electrostatic capacitance of the capacitor C11 is increased, similarly to the case of the capacitor C1 in the fifth embodiment. Accordingly, a variation $\Delta C11$ in electrostatic capacitance of the capacitor C11 can be expressed as the following numerical formula 8, using an angular velocity component $\Delta Cw$ corresponding to the Coriolis force and an acceleration component $\Delta Ca$ corresponding to the inertial force Fa.

$$\Delta C11 = \Delta Cw + \Delta Ca \qquad \text{[Numerical Formula 8]}$$

Moreover, in the displacement-detecting portion 127, both of the Coriolis force F1 and the inertial force Fa act in such a direction that the electrostatic capacitance of the capacitor C12 is decreased. Accordingly, a variation $\Delta C12$ in electrostatic capacitance of the capacitor C12 can be expressed by the following numerical formula 9.

$$\Delta C12 = -\Delta Cw - \Delta Ca \qquad \text{[Numerical Formula 9]}$$

Furthermore, in the displacement-detecting portion 128, a Coriolis force F2 is act in such a direction that electrostatic capacitance of the capacitor is increased, and the inertial force Fa act in the direction opposite to that of the Coriolis force F2. Thus, a variation $\Delta C13$ in electrostatic capacitance of the capacitor C13 can be expressed by the following numerical formula 10.

$$\Delta C13 = \Delta Cw - \Delta Ca \qquad \text{[Numerical Formula 10]}$$

In the displacement-detecting portion 129, the Coriolis force F2 acts in such a direction as to decrease the electrostatic capacitance of the capacitor C14, and the inertial force Fa act in the opposite direction. Thus, the variation $\Delta C14$ is expressed as the following numerical formula 11.

$$\Delta C14 = -\Delta Cw + \Delta Ca \qquad \text{[Numerical Formula 11]}$$

The adder amplifier 131 adds the variations $\Delta C12$ and C14 in electrostatic capacitance, and the adder amplifier 132 adds the variations $\Delta C11$ and C13 in electrostatic capacitance. A detection signal S1 corresponding to the difference between these addition results is output from the differential amplifier 135 via the synchronous detector 137. In this case, the detection signal S1 can be expressed by the following numerical formula 12, using the numerical formulae 8 to 11.

$$S1 = \Delta C12 + \Delta C14 - (\Delta C11 + \Delta C13)$$
$$= -\Delta Cw - \Delta Ca - \Delta Cw + \Delta Ca - (\Delta Cw + \Delta Ca + \Delta Cw - \Delta Ca)$$
$$= -4\Delta Cw \qquad \text{[Numerical Formula 12]}$$

When the adder amplifier 133 adds the variations $\Delta C12$ and $\Delta C13$ in electrostatic capacitance, and the adder amplifier 134 adds the variations $\Delta C11$ and $\Delta C14$ in electrostatic capacitance, the differential amplifier 136 outputs a detection signal S2 corresponding to the difference between these addition results. In this case, the detection signal S2 can be expressed by the following numerical formula 13.

$$S2 = \Delta C12 + \Delta C13 - (\Delta C11 + \Delta C14)$$
$$= -\Delta Cw - \Delta Ca + \Delta Cw - \Delta Ca - (\Delta Cw + \Delta Ca - \Delta Cw + \Delta Ca)$$
$$= -4\Delta Ca \qquad \text{[Numerical Formula 13]}$$

Accordingly, even if the angular velocity $\Omega$ on the Z axis and the acceleration $\alpha$ in the Y-axial direction are simultaneously applied, the angular velocity sensor 101 can individually detect the angular velocity and the acceleration as the detection signals S1 and S2. Moreover, in the case in which the inertial force Fa is larger than each of the Coriolis forces F1 and F2, and moreover, in the case in which the acceleration is applied in the arrow b2 direction, the angular velocity $\Omega$ and the acceleration $\alpha$ can be individually detected.

In this embodiment having the above-described constitution, the same operation and effects as those of the first, third, and fifth embodiments can be attained. Especially, in the constitution of this embodiment, the displacement-detecting portions 126 and 127 for detecting displacements in the Y-axial direction of the center mass 103, and the displacement-detecting portions 128 and 129 for detecting displacements of the outer masses 104 and 105, and the external force detecting portion 130 are provided.

Thereby, in the external force detecting portion 130, the adder amplifiers 131, 132, 133, and 134, and the differential amplifiers 135 and 136 can carry out the addition and subtraction of displacements of the center mass 103 detected by the first displacement-detecting portions 126 and 127, and displacements of the outer masses 104 and 105 detected by the second displacement-detecting portions 128 and 129. Moreover, the angular velocity components $\Delta Cw$ and the acceleration components $\Delta Ca$ contained in these displacements can be individually operated.

Thus, the external force sensor 101 can accurately derive the detection signals S1 and S2 corresponding to the angular velocity $\Omega$ and the acceleration $\alpha$. By the singular external force sensor 101, the angular velocity $\Omega$ on the Z axis and the acceleration a in the Y-direction can be independently detected, and also, the performance as an external force measuring device can be enhanced.

Since the two frame-shaped masses 107 surrounding the outer masses 104 and 105 respectively are provided, the respective frame-shaped masses 107 can securely prevent the deflection of the supporting beams 108 from being converted to a displacement and the displacement from being transmitted to the outer masses 104 and 105. Thus, the detection accuracy can be further enhanced.

Figure 18:
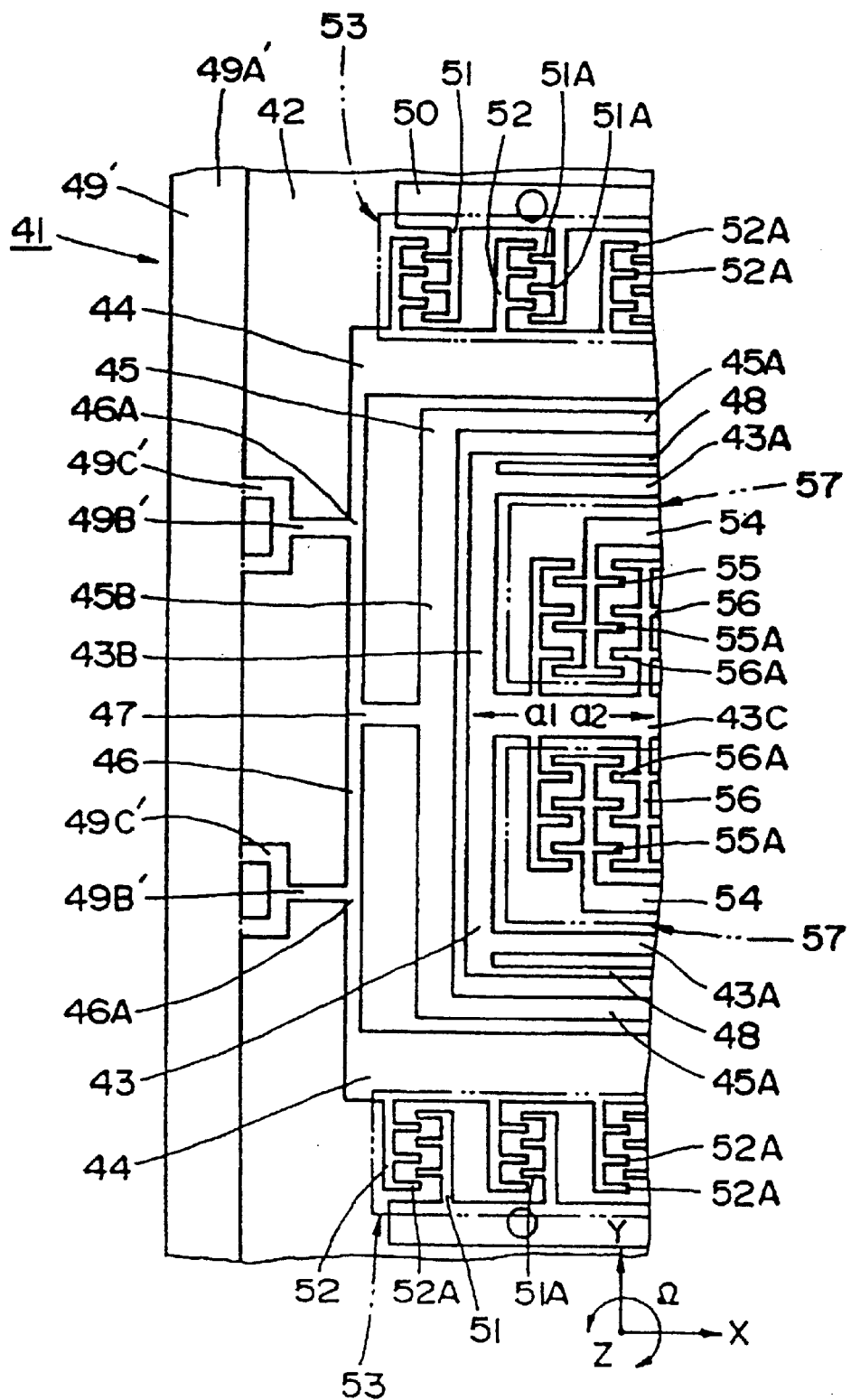
FIG. 18 is an enlarged, fragmentary view of an essential part of the angular velocity showing a modification example of the third embodiment of the present invention.

In the configurations of the third and ninth embodiments, the arms 49B and 112B in straight line patterns are protruded from the seats 49A and 112A in the fixing portions 49 and 112 to the nodes 46A and 108A of the supporting beams 46 and 108. The present invention is not limited to the configurations. For example, as shown in a modification example of FIG. 18, a buffering portion 49C' having a substantially U-shape may be formed between a seat 49A' of a fixing portion 49' and an arm 49B'. When a stress is applied to the arm 49B', caused by deflection of the supporting beams 46, the buffering portion 49C' is slightly deflected to buffer the stress. Moreover, in the sixth embodiment, a buffering portion having a substantially U-shape may be provided between the seat 112A of the fixing portion 112 and the arm 112B.

In the sixth embodiment, the frame-shaped masses 107 surround the outer masses 104 and 105, respectively. The present invention is not limited to this configuration. Not both of the frame-shaped masses 106 and 107, but only the frame-shaped mass 106 that surrounds the center mass 103 may be provided. The frame-shaped masses 107 surrounding the outer masses 104 and 105 are omitted, and the outer masses 104 and 105 are connected to the supporting beams 108 via the mass-supporting beams, similarly to the fifth embodiment.

In the sixth embodiment, the angular velocity detection signal S1 is output from the differential amplifier 135 via the synchronous detector 137, and the detection signal S2 of the acceleration a is output directly from the differential amplifier 136. The present invention is not limited to this configuration. On the output side of the differential amplifiers 135 and 136, e.g., low-pass filters or the like, for eliminating high frequency noise or the like having almost the same vibration frequency from the detection signals S1 and S2 may be provided.

As described above, according to the first aspect of the present invention, the plural masses arranged above the substrate are connected to each other via the supporting beams, and the respective masses are vibrated at opposite phases. Accordingly, the respective masses can be efficiently vibrated at the opposite phases to each other via the supporting beams by vibrating a part of the masses. Moreover, the nodes of vibration at which the supporting beams can be positioned substantially constantly with respect to the substrate when the masses are vibrated can be provided at sites in the middles of the supporting beams. The vibration state of the respective masses can be stabilized, e.g., by fixing the node sites of the supporting beams to the substrate sides. Moreover, the angular velocity can be detected separately from the acceleration caused by collision or the like. Thus, the detection operation can be stabilized.

Preferably, the fixing portions connect to the substrate the sites of the supporting beams corresponding to the nodes when the respective masses are vibrated at opposite phases to each other. In the positions of the fixing portions, vibrations of the respective masses can be canceled out. Thus, transmission of the vibrations to the substrate via the supporting beams can be securely prevented. Thereby, with vibration energy caused by the vibration generators, the respective masses can be efficiently vibrated at a predetermined amplitude, vibration velocity, and so forth without the vibration energy being dissipated to the substrate side. Furthermore, the detection sensitivity for an external force (angular velocity) can be stabilized. Moreover, the respective masses can be prevented from being displaced in the external force detection direction in error. Thus, the detection accuracy and reliability for the external force can be enhanced.

Preferably, the supporting beams support the respective masses displaceably in the Z-axial direction, and the external force detecting means detects the displacement of the respective masses when the masses are displaced in the Z-axial direction. Thus, the respective masses can be displaced in the Z-axial direction correspondingly to the angular velocity, the acceleration, or the like, while the masses are being vibrated in the X-axial direction. The displacement can be detected as the external force.

More preferably, the respective masses comprise a first mass supported by mass-supporting beams, of which a displacement in the Y-axial direction is to be detected as the angular velocity, and second masses positioned on both of the sides of the first mass. Therefore, the second masses can be symmetrically positioned, sandwiching the first mass, and the respective masses can be stably vibrated at opposite phases with respect to the X-axial direction. In this state, the displacement of the first mass, caused when it is displaced in the Y-axial direction via the mass-supporting beams, can be detected as the angular velocity. Moreover, when no angular velocity is added, the supporting beams are deflected in the X-axial direction, and thereby, the first and second masses can be vibrated only in the X-axial direction, and the mass-supporting beams can be held so as not to be displaced in the Y-axial direction. Accordingly, the first mass can be prevented from being also displaced in the Y-axial direction in error, caused by deflection or the like of the supporting beams. The detection accuracy and reliability can be enhanced.

Preferably, the second masses are connected to each other displaceably in the X-axial direction via the supporting beams, the third masses are connected to the supporting beams via the connecting portions, and the first mass is connected displaceably in the Y-axial direction within the third masses via the mass-supporting beams. Thus, the displacement of the first mass, caused when the first mass is displaced in the Y-axial direction via the mass-supporting beams, caused by the angular velocity while all of the first, second, and third masses are vibrated in the X-axial direction by means of the vibration generators, can be detected as the angular velocity. Then, vibrations of the respective masses can be securely prevented from being transmitted to the substrate. When no angular velocity is added, the third masses can prevent deflection or the like of the supporting beams from being converted to a displacement in the Y-axial direction and being transmitted to the first mass. The detection accuracy can be more enhanced.

More preferably, the fixing portions connect to the substrate the sites of the supporting beams corresponding to the nodes thereof caused when the respective masses are vibrated at opposite phases. Thus, vibration of the respective masses can be securely prevented from being transmitted to the substrate via the supporting beams.

Preferably, the first and second masses are connected to the supporting beams via the first and second mass supporting beams displaceable in the Y-axial direction. Thus, the first and second masses can be displaced in the Y-axial direction, correspondingly to the angular velocity or the acceleration, while the masses are vibrated via the supporting beams in the X-axial direction. Accordingly, the external force detecting means can detect the angular velocity and the acceleration by use of the displacements of the first and second masses.

Further, according to the present invention, the first and second masses are connected to the third and fourth masses via the first and second mass supporting beams, and the third and fourth masses are connected to the supporting beams. The first and second masses can be displaced in the Y-axial direction correspondingly to the angular velocity and the acceleration while the first and second masses are vibrated via the supporting beams in the X-axial direction at opposite phases. Moreover, the third and fourth masses can prevent deflection or the like of the supporting beams from being transmitted to the first and second masses.

Preferably, the fixing portions connect to the substrate the sites of the supporting beams corresponding to the nodes of the supporting beams caused when the respective masses are vibrated at opposite phases. Thus, the respective masses can securely suppress vibration of the respective masses from being transmitted to the substrate via the supporting beams.

Also preferably, the external force detecting means combine displacements of the masses when they are vibrated at opposite phases to each other and simultaneously are displaced in the detection direction, respectively, and detect them. Accordingly, for example, when the angular velocity and the acceleration are added to the respective masses, the displacements of the masses are combined by addition, subtraction, and so forth, so that the acceleration components of the displacements of these masses, caused when the masses are displaced in the same direction, due to the acceleration, can be securely canceled out. For example, the angular velocity can be separated from the acceleration and stably detected. Accordingly, even if not only an angular velocity but also an acceleration, caused by collision or the like, is applied to the external force measuring device, the detection accuracy of the angular velocity can be securely enhanced.

Preferably, the external force detecting means detects in parallel displacements of the first and second movable-side detection electrodes with respect to the fixed-side detection electrode, as variations in electrostatic capacitance. Thus, the two capacitors can be formed in parallel between the movable detection electrodes and the fixed detection electrode. When the angular velocity and the acceleration are applied to the first and second masses, the first and second movable detection electrodes are displaced in the same direction with respect to the fixed detection electrodes, so that the acceleration components of the variations in electrostatic capacitance between the two capacitors can be securely canceled out. Thus, the angular velocity component can be detected by means of the simple electrode configuration, not using a complicate operation processing or the like.

Accordingly, when an angular velocity is applied to the respective masses in the state in which the first and second masses are vibrated at opposite phases to each other, these masses are displaced in the opposite directions, due to the Coriolis force. As a result, for example, both of the first and second movable electrodes can be positioned near the fixed detection electrodes, so that electrostatic capacitances between them can be increased correspondingly to the angular velocity. Moreover, when an acceleration is added to the first and second masses, these masses are displaced in the same direction. Therefore, one of the first and second movable detection electrodes can be positioned near the fixed detection electrode, and the other can be more separated from the fixed detection electrode. Thus, variations in electrostatic capacitance between the respective detection electrodes, caused by the acceleration, can be canceled out.

Also preferably, the external force detecting means comprises the first and second displacement detecting portions for detecting displacements of the first and second masses, and the external force operation section for individually operating the angular velocity and the acceleration by use of the detection results of the respective displacement detecting portions. Thus, the external force operation section can individually operate the angular velocity components and the acceleration components contained in the respective detection values by determining the sum and the difference of values detected in the first and second displacement detecting portions. Accordingly, the angular velocity and the acceleration of the respective masses can be detected, stably and independently of each other. The performance as an external force measuring device can be enhanced.

Preferably, the external forced detector comprises the fixed detection electrodes and the movable detection electrodes, each having an interdigitated pattern. Thus, the electrode portions of the fixed detection electrodes and the movable detection electrodes are engaged with each other, so that large areas between the opposed detection electrodes can be produced. When the masses are displaced in the Y-axial direction, due to an external force, the displacements can be detected as variations in distance (electrostatic capacitance) between the detection electrodes.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An external force measuring device comprising: a substrate; plural masses opposed to and spaced from the substrate, arranged in the Y-axial direction of three orthogonal axial directions, X-, Y-, and Z-axial directions, such as to be vibratable in the X-axial direction at opposite phases to each other; a vibration generator for vibrating the plural masses; supporting beams connecting the respective masses displaceably in the X-axial direction; fixing portions provided between the supporting beams and the substrate; and an external force detector for detecting, a displacement of the respective masses in one of the Y- and Z-axial directions, caused when an angular velocity or an acceleration acts on the respective masses.

2. An external force measuring device according to claim 1, wherein the fixing portions connect to the substrate the sites of the supporting beams corresponding to the nodes thereof caused when the respective masses are vibrated at opposite phases.

3. An external force measuring device according to one of claims 1 and 2, wherein the supporting beams support the respective masses displaceably in the Z-axial direction, and the external force detector detects the displacements of the respective masses, caused when the masses are displaced in the Z-axial direction.

4. An external force measuring device according to one of claims 1 and 2, wherein said respective masses comprise a first mass, and second masses positioned respectively on both of the sides in the Y-axial direction of the first mass, the first mass being supported by the supporting beams via mass-supporting beams displaceable in the Y-axial direction, and the external force detector detecting the displacement of the first mass caused when the first mass is displaced in the Y-axial direction.

5. An external force measuring device according to any one of claims 1 and 2, wherein said external force detector comprises: a fixed detection electrode positioned on the substrate opposite the first mass and a movable detection electrode provided on the first mass and opposed to and spaced from the substrate in the Z-axial direction.

6. An external force measuring device comprising: a substrate; a first mass opposed to and spaced from the substrate, arranged in the Y-axial direction of three orthogonal axial directions, X-, Y-, and Z-axial directions, such as to be vibratable in the X-axial direction; a vibration generator for vibrating the plural masses; second masses provided on both of the sides in the Y-axial direction of the first mass so as to sandwich the first mass and to be vibrated in the X-axial direction by the vibration generator; third masses positioned between the first mass and the second masses so as to surround the first mass; supporting beams connecting the second masses to each other displaceably in the X-axial direction; connecting portions connecting the third masses to the supporting beams; mass-supporting beams connecting the first mass to the third masses displaceably in the Y-axial direction; fixing portions provided between the substrate and the supporting beams and connecting the supporting beams to the substrate; and an external force detector for detecting a displacement in the Y-axial direction of the first mass caused when an angular velocity acts on the first mass, said first and third masses, and said second and fourth masses being vibrated at opposite phases to each other.

7. An external force measuring device according to claim 6, wherein said fixing portions connect to the substrate the sites of the supporting beams corresponding to the nodes thereof caused when the first and third masses and the second mass are vibrated at opposite phases to each other.

8. An external force measuring device according to one of claims 6 and 7, and the second masses are positioned on both of the sides in the Y-axial direction of the first mass, and the first and second masses are connected to the supporting beams via the first and second mass supporting beams displaceable in the Y-axial direction, respectively.

9. An external force measuring device comprising: a substrate; a first mass opposed to and spaced from the substrate such as to be vibratable along the X-axial direction of three orthogonal axial directions is, X-, Y-, and Z-axial directions; second masses provided on both of the sides in the Y-axial direction of the first mass so as to sandwich the first mass such as vibratable in the X-axial direction; third masses positioned between the first mass and the second masses so as to surround the first mass; fourth masses surrounding the second masses; a vibration generator for vibrating the first mass, the second, third, and fourth masses; supporting beams connecting the fourth masses to each other displaceably in the X-axial direction; connecting portions connecting the third masses to the supporting beams; first mass supporting beams connecting the first mass to the third masses displaceably in the Y-axial direction; second mass supporting beams connecting the second masses to the fourth masses displaceably in the Y-axial direction; fixing portions provided between the substrate and the supporting beams and connecting the supporting beams to the substrate; and an external force detector for detecting, the displacement in the Y-axial direction of the first and second masses, caused when an angular velocity or acceleration acts on the first and second masses, said first and third masses, and said second and fourth masses being vibrated at opposite phases to each other.

10. An external force measuring device according to claim 9, wherein the fixing portions connect to the substrate the sites of the supporting beams corresponding to the nodes caused when the first and third masses and the second and fourth masses are vibrated at opposite phases to each other.

11. An external force measuring device according to one of claims 1, 2, 6 and 7, wherein the external force detector combines displacements of the respective masses caused when the masses are vibrated in opposite phases such as to be displaced in the Y-axial direction to detect at least angular velocity applied to the respective masses, separately from the acceleration.

12. An external force measuring device according to claim 8, wherein said external force detector comprises: fixed detection electrodes positioned between the first mass and the second masses and provided on the substrate; first movable detection electrodes provided on the first mass and opposed to and spaced in the Y-axial direction from the fixed detection electrodes; and second movable detection electrodes provided on the second masses and opposed to and spaced in the Y-axial direction from the fixed detection electrodes, the external force detecting means detector, in parallel, displacements of the first and second movable detection electrodes with respect to the fixed detection electrodes as variations in electrostatic capacitance.

13. An external force measuring device according to any one of claims 6, 7, 9 and 10, wherein said external force detector comprises: a first displacement detecting portion for detecting a displacement caused when the first mass, which is one of the first and second masses vibrating at opposite phases to each other, is displaced in the Y-axial direction; a second displacement detecting portion for detecting displacements caused when the second masses are displaced in the Y-axial direction; and an external force operation section for individually operating the angular velocity and the acceleration, using the displacements detected by the first and second displacement detecting portions.

14. An external force measuring device according to one of claims 1, 2, 6 and 7, wherein the external force detector comprises fixed detection electrodes each having plural electrodes fixedly formed in an interdigitated pattern on the substrate; and movable detection electrodes formed on the masses and having plural electrode plates interdigitatedly engaged with and spaced from the plural electrodes of the respective fixed detection electrodes, defining spaces in the Y-axial direction; and the external force detector detects variations in electrostatic capacitance between the fixed detection electrodes and the movable detection electrodes as the displacements of the masses.

* * * * *